United States Patent [19]
Yuasa et al.

[11] Patent Number: 5,316,693
[45] Date of Patent: May 31, 1994

[54] LIQUID CRYSTAL COMPOSITION AND INFORMATION DISPLAY APPARATUS USING THE LIQUID CRYSTAL COMPOSITION

[75] Inventors: Kimihiro Yuasa; Motohisa Ido; Ryusuke Watanabe, all of Sodegaura, Japan

[73] Assignee: Idemitsu Kosan Co., Ltd., Tokyo, Japan

[21] Appl. No.: 866,343

[22] Filed: Apr. 10, 1992

[30] Foreign Application Priority Data

Apr. 18, 1991 [JP] Japan ................... 3-112112

[51] Int. Cl.$^5$ ............ C09K 19/52; C09K 19/12; C09K 19/20; C09K 19/34
[52] U.S. Cl. ............ 252/299.01; 252/299.61; 252/299.66; 252/299.67
[58] Field of Search ........ 252/299.01, 299.66, 252/299.61, 299.67

[56] References Cited

U.S. PATENT DOCUMENTS

| | | | |
|---|---|---|---|
| 4,774,028 | 9/1988 | Imai et al. | 260/397.2 |
| 4,844,835 | 7/1989 | Uchida et al. | 252/299.01 |
| 4,954,600 | 9/1990 | Hachiya et al. | 528/89 |
| 4,981,607 | 1/1991 | Okawa et al. | 252/299.01 |
| 5,034,153 | 7/1991 | Uchida et al. | 252/299.65 |
| 5,106,530 | 4/1992 | Haas et al. | 252/299.6 |
| 5,200,108 | 4/1993 | Yuasa et al. | 252/299.01 |

FOREIGN PATENT DOCUMENTS

| | | |
|---|---|---|
| 0260786 | 3/1988 | European Pat. Off. |
| 0292244 | 11/1988 | European Pat. Off. |
| 0322703 | 7/1989 | European Pat. Off. |
| 0414938 | 3/1991 | European Pat. Off. |
| 0493601 | 7/1992 | European Pat. Off. |
| 404268390 | 9/1992 | Japan |

OTHER PUBLICATIONS

Liquid Crystals, vol. 8, No. 2, 1990, pp. 163-170; I. Cabrerra, et al "Liquid crystal polymers from swallow-tailed mesogens".

*Primary Examiner*—Robert L. Stoll
*Assistant Examiner*—C. Harris
*Attorney, Agent, or Firm*—Antonelli, Terry, Stout & Kraus

[57] ABSTRACT

A liquid crystal composition comprising 5 to 99% by weight of a liquid-crystalline copolymer, which has both an alkyl chain and a siloxane chain in its main chain, and 1 to 95% by weight of a low molecular weight liquid-crystalline compound operates at a wide range of temperatures including room temperature, has an excellent film formability, is easy to orient to a high degree by mechanical orientation methods including bending orientation method and responds to the change of electric field at a high speed.

12 Claims, 2 Drawing Sheets

LIQUID CRYSTAL COMPOSITION AND INFORMATION DISPLAY APPARATUS USING THE LIQUID CRYSTAL COMPOSITION

BACKGROUND OF THE INVENTION (a) Field of the Invention

The present invention relates to a liquid crystal composition suitable for the use in various liquid crystal devices, including liquid crystal display devices, liquid crystal optical devices and liquid crystal memory devices. The present invention further relates to an information display apparatus which uses the liquid crystal composition and is suitable for displaying news or advertisement.

(b) Description of the Related Art

As liquid crystal compositions for the use in liquid crystal devices, there were proposed polymer liquid crystal compositions that comprise polymer liquid-crystalline compounds containing asymmetric carbon atoms and low molecular weight liquid-crystalline compounds [Japanese Patent Application Kokai Koho (Laid-open) No. 63-284291]. However, since the side-chain polymer liquid-crystalline compounds exemplified therein have general alkylate or siloxane main-chains which provide insufficient spacing between adjacent side-chains, increasing the molecular weight prevents sufficient mixing of low molecular weight liquid-crystalline compounds for increasing the response speed. This makes it difficult to endow the compositions with a high speed responsibility while maintaining the intrinsic polymeric properties. There is another problem that the temperature range of chiral smectic C phase is so narrow that even the mixing of the low molecular weight liquid-crystalline compounds has difficulty in providing liquid crystal compositions operable at a wide range of temperatures including room temperature.

As to information display apparatuses, there was proposed a display comprising a liquid crystal display, a memory member for memorizing the substance of display, a control member for interface, a connector member for connecting with a host processor and a battery member for supplying electric force [Japanese Patent Application Kokai Koho (Laid-open) No. 64-70793]. After separated from the host processor, the display continue to display the display substance. It, however, involves problems that separation of the host processor necessitates supply of electric force to activate the memory part to perform display, that each time the display substance is changed, connection with the host processor is required, and increasing the display area is difficult due to the use of the conventional liquid crystal display.

SUMMARY OF THE INVENTION

An object of the present invention is to provide a liquid crystal composition which functions at a wide range of temperatures including room temperature, has excellent formability into film, can be oriented to a high degree by mechanical orientation methods, such as a bending orientation, is capable of tilt angle (2θ) control, and responses to the change of electric field at a high speed.

Another object of the present invention is to provide an information display apparatus which enables display on a large surface or a curved surface, can display a variety of substance with a simple driving control circuit, is resistant to mechanical shock, and requires no external power supply and can be made thinner and lighter.

As the result of study for solving the above-described problems, the inventors found that the problems can be solved by liquid crystal compositions obtained by mixing liquid-crystalline copolymers having both alkyl chains and siloxane chains in main-chains with low molecular weight liquid-crystalline compounds in a specific ratio, and the finding led the inventors to complete the present invention.

That is, the present invention provides a liquid crystal composition which comprises a liquid-crystalline copolymer selected from (a) a liquid-crystalline copolymer comprising a repeating unit represented by the following formula [I]

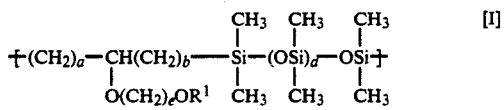

wherein
each of a and b is an integer of 2 to 5, d is an integer of 0 to 3, e is an integer of 1 to 20, and $R^1$ is

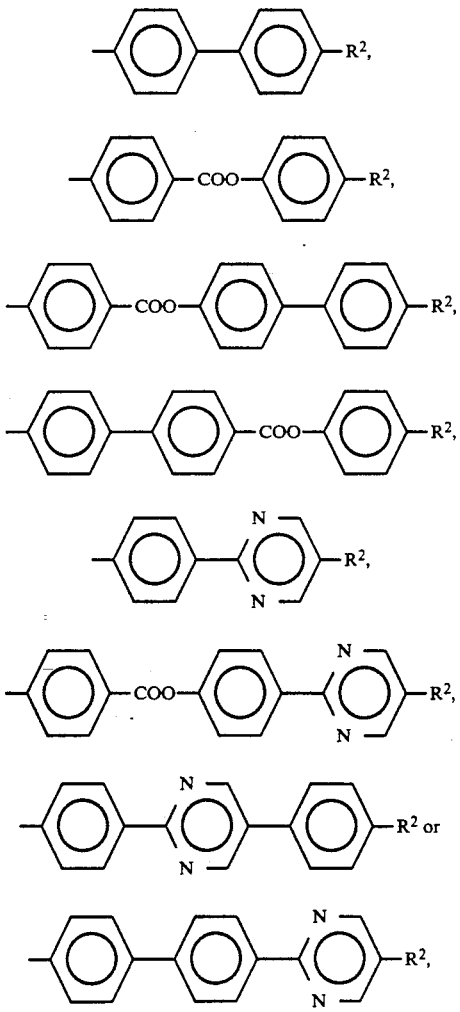

$R^2$ is —COOR³, —OR³ or —OCOR³,
$R^3$ is

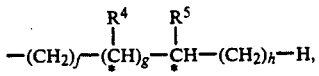

* indicating an asymmetric carbon atom, each of $R^4$ and $R^5$ being methyl group or a halogen atom, f being an integer of 0 to 10, g being an integer of 0 to 1 and h being an integer of 1 to 11 with the proviso that when $R^5$ is methyl group, h is not an integer of 1,
and
(b) a liquid-crystalline copolymer comprising a repeating unit represented by the following formula [II] and a repeating unit represented by the following formula [III]

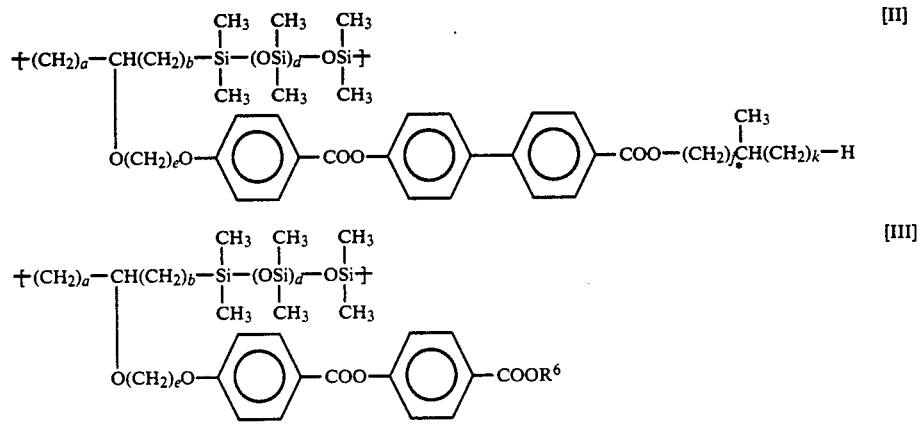

wherein
*, a, b, d and e are as defined above, j is an integer of 0 to 3, k is an integer of 2 to 7, $R^6$ is an optically active group represented by the following formula [IV] or an optically inert group represented by the following formula [V]

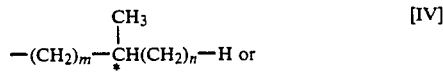

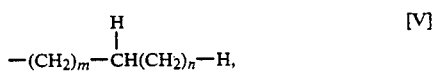

* being as defined above, m being an integer of 0 to 3, and n being an integer of 2 to 7,
the repeating unit [II] and the repeating unit [III] being present in the liquid-crystalline copolymer (b) in a molar ratio [Ill/[III] of 1/99 to 99/1;
and a low molecular weight liquid-crystalline compound, the liquid crystal composition containing 5 to 99 % by weight of the liquid-crystalline copolymer based on the total of the liquid-crystalline copolymer and the low molecular weight liquid-crystalline compound.

PREFERRED EMBODIMENTS OF THE INVENTION

Figure 1:
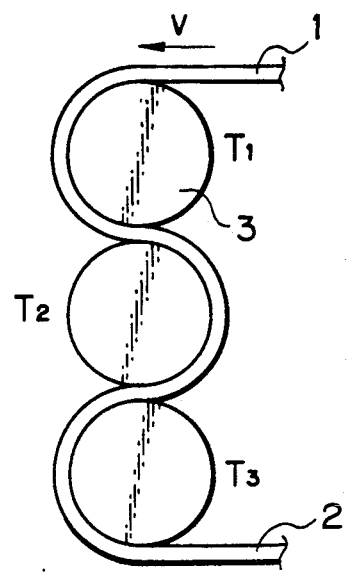
FIG. 1 is a drawing illustrating the orienting apparatus used in Examples.

The liquid-crystalline copolymer to be used in the present invention is a liquid-crystalline copolymer comprising the repeating unit represented by the formula [I] or a liquid-crystalline copolymer comprising the repeating units represented by the formulas [III and [III]. The use of the side-chain polymer liquid crystal having both the alkyl chains and the siloxane chains in main-chains as a liquid-crystalline copolymer component provides a liquid crystal composition which functions at a wide range of temperatures including room temperature and is excellent in film forming properties and in capability of orientation.

Preferred weight average molecular weight (Mw) of the liquid-crystalline copolymer is at least 1000, more preferably, 1000 to 100,000. The liquid-crystalline copolymer may be an oligomer liquid crystal, such as a dimer or a trimer.

Some examples of the liquid-crystalline copolymer comprising the repeating unit represented by the formula [I] includes the following liquid-crystalline copolymers comprising the following repeating units:
(a) a liquid-crystalline copolymer comprising the repeating unit represented by the following formula

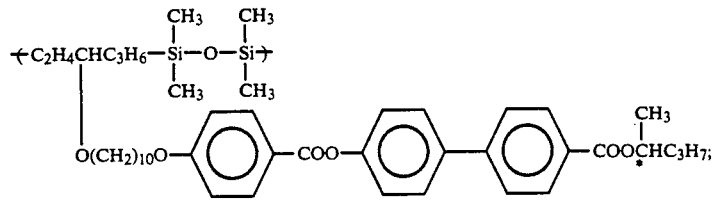

(b) a liquid-crystalline copolymer comprising the repeating unit represented by the following formula

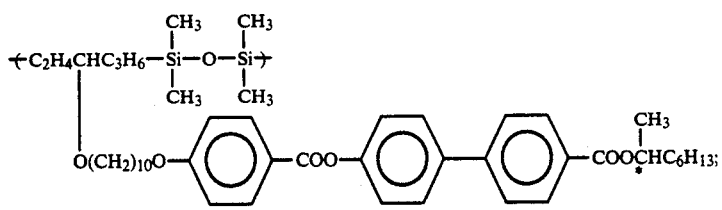

(c) a liquid-crystalline copolymer comprising the repeating unit represented by the following formula

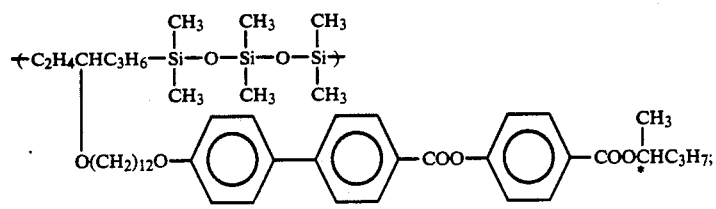

(d) a liquid-crystalline copolymer comprising the repeating unit represented by the following formula

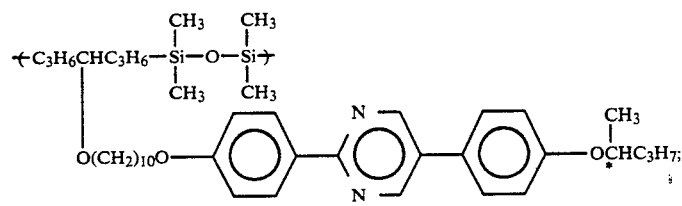

(e) a liquid-crystalline copolymer comprising the repeating unit represented by the following formula

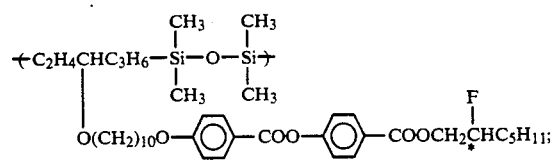

(f) a liquid-crystalline copolymer comprising the repeating unit represented by the following formula

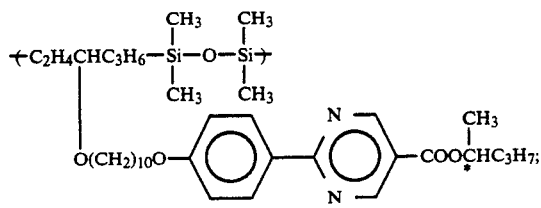

(g) a liquid-crystalline copolymer comprising the repeating unit represented by the following formula

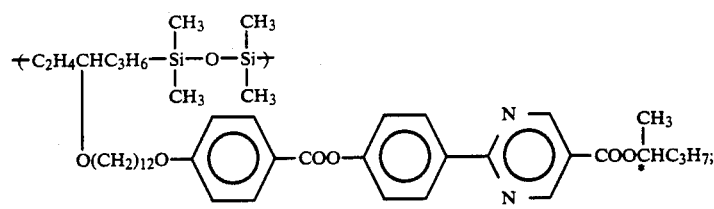

(h) a liquid-crystalline copolymer comprising the repeating unit represented by the following formula

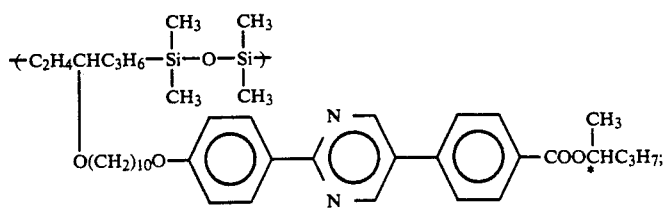

(i) a liquid-crystalline copolymer comprising the repeating unit represented by the following formula

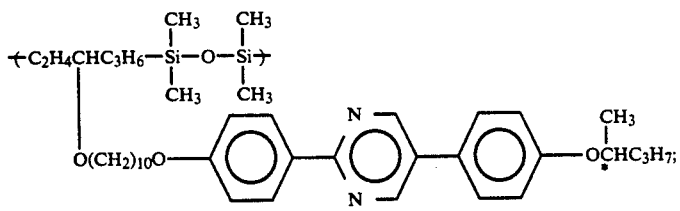

(j) a liquid-crystalline copolymer comprising the repeating unit represented by the following formula

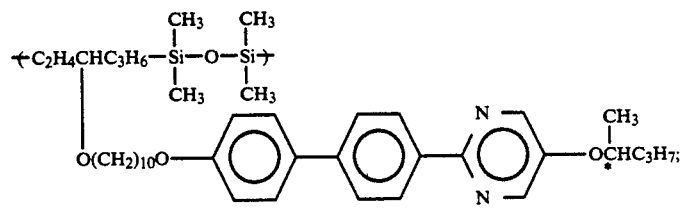

(k) a liquid-crystalline copolymer comprising the repeating unit represented by the following formula

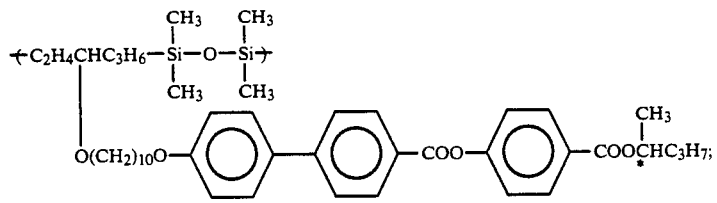

(l) a liquid-crystalline copolymer comprising the repeating unit represented by the following formula

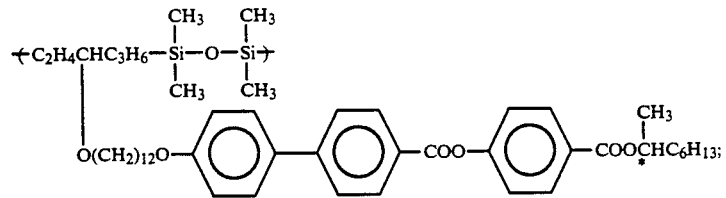

(m) a liquid-crystalline copolymer comprising the repeating unit represented by the following formula

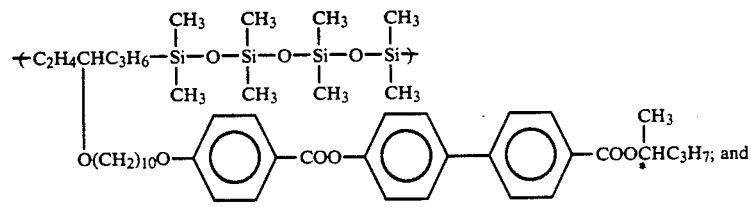

(n) a liquid-crystalline copolymer comprising the repeating unit represented by the following formula

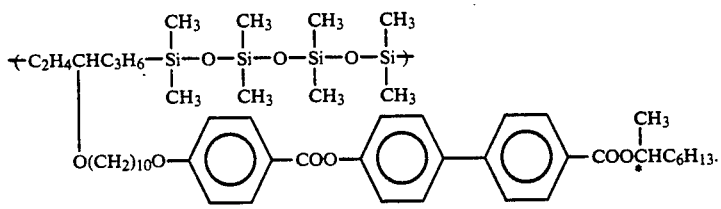

The liquid-crystalline copolymer comprising the repeating unit represented by the formulas [II] and [III] to be used in the present invention comprises the repeating unit [II] and the repeating unit [III] in a molar ratio ([III/[III]]) of 1/99 to 99/1, preferably, in a molar ratio ([III/[III]]) of 40/60 to 95/5. Preferred liquid-crystalline copolymers comprising the repeating units represented by the formulas [II] and [III] are those wherein a is an integer of 2 or 3, b is an integer of 5-a, d is 0 or 1 and e is an integer of 2 to 20.

Typical examples of the liquid-crystalline copolymer comprising the repeating units [II] and [III] are those two represented by the following formulas: a liquid-crystalline copolymer comprising the repeating units represented by the following formulas

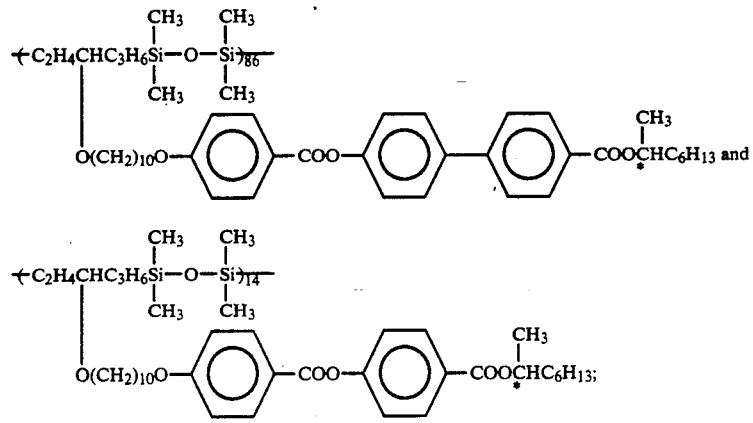

and a liquid-crystalline copolymer comprising the repeating units represented by the following formulas

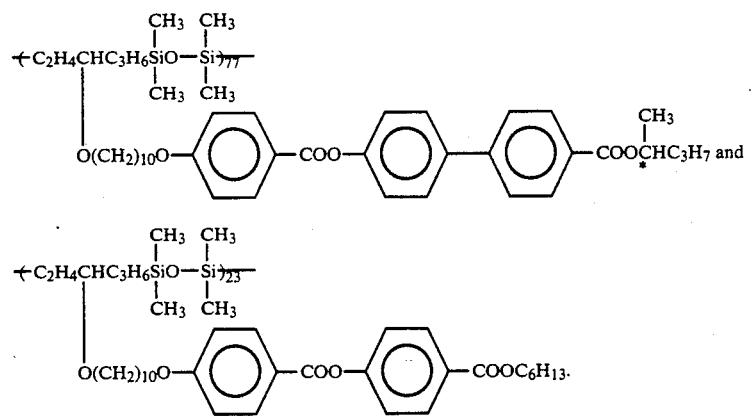

As to the low molecular weight liquid-crystalline compound to be used in the present invention, known low molecular weight liquid-crystalline compounds may be suitably used. Two or more low molecular weight liquid-crystalline compounds may be used as a mixture in order to control the temperature range wherein the obtained liquid crystal composition exhibits liquid crystal phases, the tilt angle of the liquid crystal composition or the response time to the change of electric field. It is difficult to limit the molecular weight of the low molecular weight liquid-crystalline compound, and the low molecular weight liquid-crystalline compound to be used in the present invention is a liquid-crystalline compound having no repeating unit in its structure and includes a monomer liquid-crystalline compound.

Preferred low molecular weight liquid-crystalline compounds contain in molecules the same mesogen groups as those of the liquid-crystalline copolymers contained in the liquid crystal composition since such low molecular weight liquid-crystalline compounds enable increasing the response characteristics to electric field without decreasing the tilt angle (2θ) of the liquid crystal composition. Herein, the mesogen group of the liquid-crystalline copolymer means the cyclic part which does not include the spacer part and the flexible end group of the side-chain of the liquid-crystalline copolymer. Examples of such liquid-crystalline compounds include (1) one wherein only its mesogen group is the same as that of the liquid-crystalline copolymer,
(2) one which contains in molecule the same structure as the structure ranging from the mesogen group to the flexible end group contained in the side-chain of the liquid-crystalline copolymer, for example, the low molecular weight liquid-crystalline compounds represented by the following formula

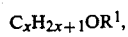

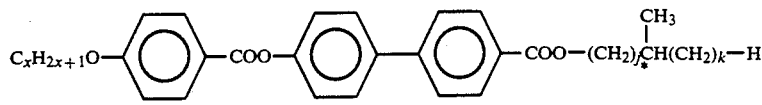

or

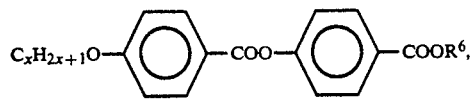

wherein x is an integer of 6 to 14, j, K, $R^1$ and $R^6$ are as defined above, and (3) a liquid-crystalline monomer constituting the repeating unit of the liquid-crystalline copolymer, that is, when the liquid-crystalline copolymer is the one comprising the repeating unit [I], the low molecular weight liquid-crystalline compounds represented by the following formula

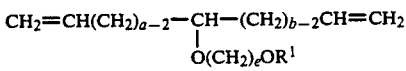

wherein a, b, e and $R^1$ are as defined above, and when the liquid-crystalline copolymer is the one comprising the repeating units [II] and [III], the low molecular weight liquid-crystalline compound represented by the following formula

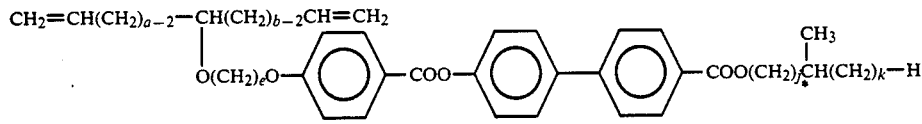

or

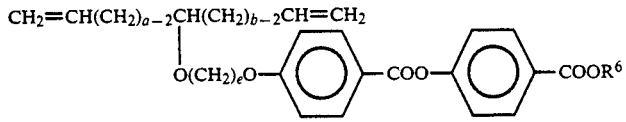

wherein a, b, e, j, k and $R^6$ are as defined above.

Among the liquid crystal compositions comprising the liquid-crystalline copolymer and the low molecular weight liquid-crystalline compound which have the same mesogen group, particularly preferred are (A) one wherein the liquid-crystalline copolymer comprises the repeating unit [I] and $R^1$ is

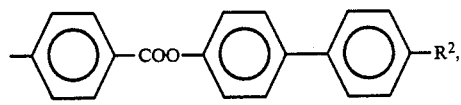

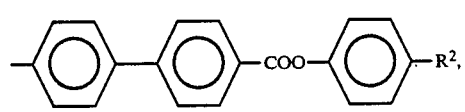

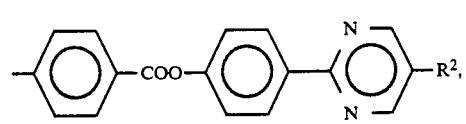

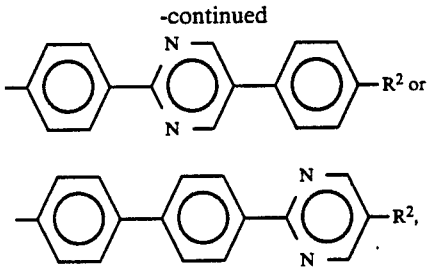

and the low molecular weight liquid-crystalline compound is a tricyclic monomer constituting the repeating unit [I] of the liquid-crystalline copolymer and represented by the following formula

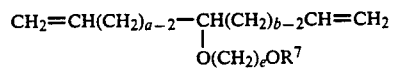

wherein $R^7$ is

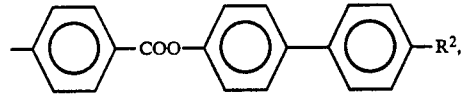

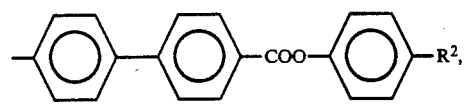

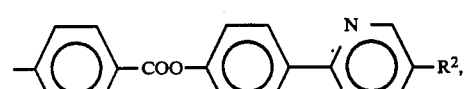

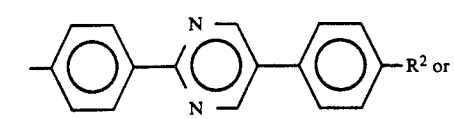

-continued

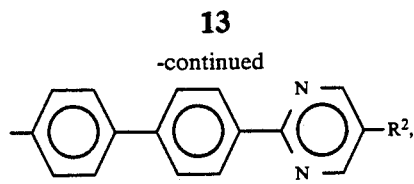

(B) one wherein the liquid-crystalline copolymer comprises the repeating units [II] and [III], and the low molecular weight liquid-crystalline compound is a tricyclic monomer constituting the repeating unit [II] of the liquid-crystalline copolymer and represented by the following formula

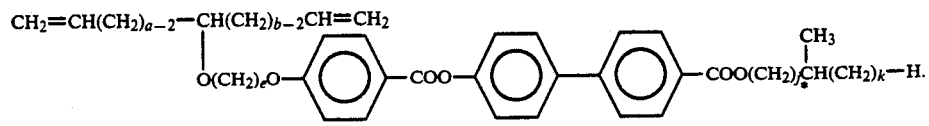

and

Typical examples of the low molecular weight liquid-crystalline compound to be used in the present invention include the followings:

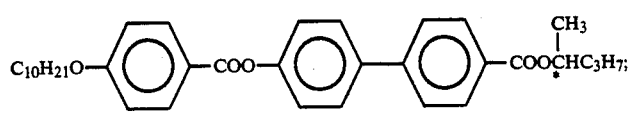

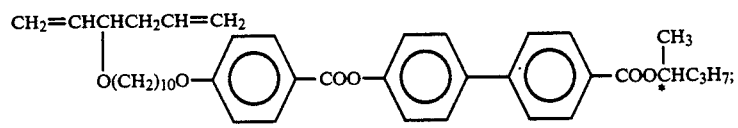

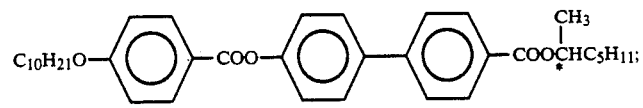

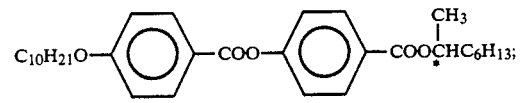

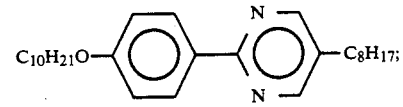

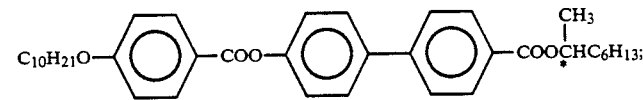

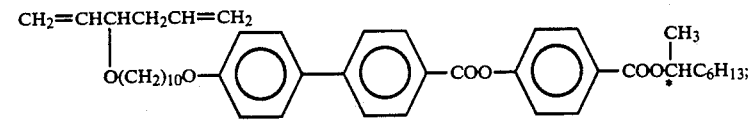

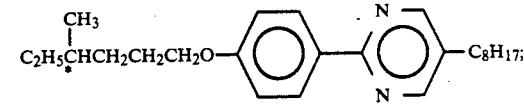

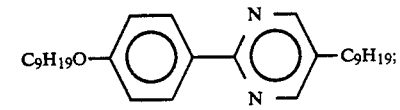

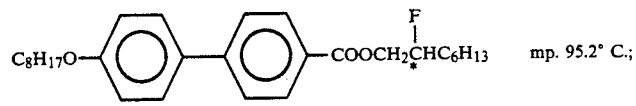

mp. 95.2° C.;

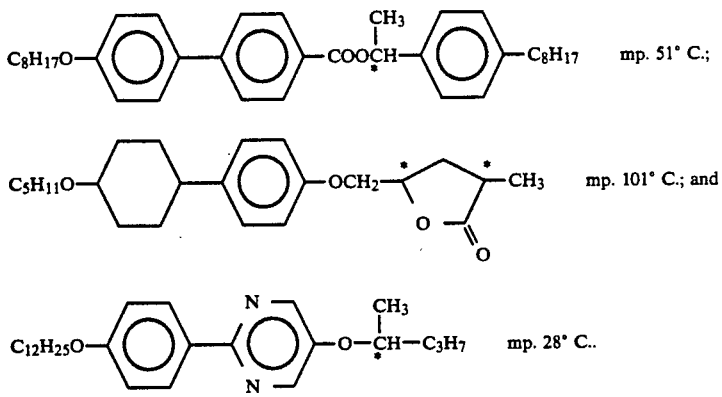

mp. 51° C.;

mp. 101° C.; and mp. 28° C..

As to the typical examples of the combination of the liquid-crystalline copolymer and the low molecular weight liquid-crystalline compound which have the same mesogen group, in the case where the above-described liquid-crystalline copolymer (k) is used as a liquid-crystalline copolymer, it is preferable to use one or more of the following low molecular weight liquid-crystalline compounds (1) to (3).

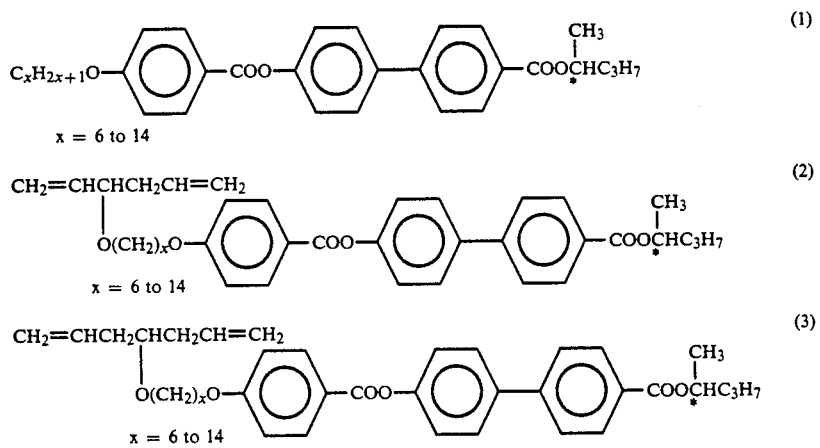

"x" is preferably an integer of 8 to 12.

The method of mixing the liquid-crystalline copolymer and the low molecular weight liquid-crystalline compound is not limited, and may be a direct mixing method or a solution mixing method. For example, by a preferred solution mixing method, after a predetermined amounts of liquid-crystalline copolymers and low molecular weight liquid-crystalline compounds are introduced in a vessel, are dissolved in a solvent, such as dichloromethane, and are mixed, the solvent is evaporated out.

The mixing ratio of the liquid-crystalline copolymer to the total of the liquid-crystalline copolymer and the low molecular weight liquid-crystalline compound is 5 to 99% by weight, preferably 10 to 95% by weight. When the ratio of the liquid-crystalline copolymers is less than 5% by weight, the film forming properties and the capability of orientation of the liquid crystal composition will be decreased. If it exceeds 99% by weight, the response time to the change of electric field will be increased.

The combination of the liquid-crystalline copolymers and the low molecular weight liquid-crystalline compounds is preferably so selected that the liquid crystal composition has such a composition as to exhibit a ferroelectric liquid crystal phase or an antiferroelectric liquid crystal phase which has an excellent responsibility to electric field. Although it is difficult to formulate such composition because it depends on the compounds used, exhibition of a ferroelectric liquid crystal phase or an antiferroelectric liquid crystal phase can be attained easily by introducing asymmetric carbon atoms into at least one compound contained in the liquid crystal composition. In particular, the liquid-crystalline copolymers exemplified above exhibit a ferroelectric liquid crystal phase at a wide range of temperatures, and addition of appropriate low molecular weight liquid-crystalline compounds makes the obtained liquid crystal composition exhibit a ferroelectric liquid crystal phase at a wide range of temperatures including room temperature.

It is also preferable to endow the liquid crystal composition with a dichroism by adding dichroic pigments or by using copolymers a copolymerization product of a pigment part and a liquid-crystalline part.

Suitable examples of the dichroic pigments are known pigments which have been used in the conventional guest-host liquid crystal display devices. Typical examples include anthraquinone derivatives, azo derivatives, diazo derivatives, merocyanine derivatives and tetrazine derivatives. These may be used individually or as a mixture of two or more of them. Preferred are black pigments, which increase the contrast easily.

In general, increasing the content of the low molecular weight liquid-crystalline compound improves the characteristics of the liquid crystal composition in responding to electric field, but sometimes decreases the film formability of the liquid crystal composition or the mechanical strength of liquid crystal display devices. In order to prevent such a bad influence, it is desirable to add 2 to 30% by weight of non-liquid-crystalline polymers into the liquid crystal composition. Some examples of the non-liquid-crystalline polymer compound include polyacrylic acid, polymethacrylic acid, polyacrylates, polymethacrylates, polyacrylamide, polyvinylalcohols, polyvinylacetate, polycarbonates, polyesters obtainable by condensing dicarboxylic acid derivatives and diol derivatives, polyamides obtainable by condensing dicarboxylic acid derivatives and diamine derivatives, and polyamides obtainable by condensing dicarboxylic acid derivatives, monoalcohols and monoamine derivatives. Particularly preferred are acrylic thermoplastic resins, such as PMMA (poly-methyl-methacrylate) and PBMA (poly-butyl-methacrylate).

The present invention further provides an information display apparatus comprising a liquid crystal display device wherein the liquid crystal composition of the present invention is disposed between two flexible substrates which bear on surfaces facing each other respective electrodes; a receiving member for receiving, through radio signals from the outside, a substance which is to be displayed by the liquid crystal display device; a driving circuit for driving the liquid crystal optical device according to signals sent from the receiving member; and a power supply member for supplying electric force to the driving circuit.

In the information display apparatus of the present invention, all the liquid crystal display device, the receiving member, the driving circuit and the power supply member are incorporated in a body, and it is preferable to enclose the whole information display apparatus with a protecting member, such as a protecting cover.

The information display apparatus comprises the liquid crystal composition and the two flexible substrates which bear respective electrodes and support the liquid crystal composition between them. The flexible substrates may be any ones which have been commonly used in liquid crystal display devices. Some examples include those made of crystalline polymers, such as uniaxially or biaxially stretched polyethyleneterephthalate, non-crystalline polymers, such as polysulfones and polyethersulfons, polyolefins, such as polyethylene and polypropylene, polycarbonates, and polyamides, such as nylons. The flexible substrates enable the liquid crystal display device to have a curved surface, thereby endowing the liquid crystal display device with a high speed response characteristics and an ability of display on a large and curved surface. Further, the liquid crystal display device of the present invention continues display even after a power supply is cut off.

The electrodes born on the flexible substrates may be any one commonly used in liquid crystal display devices. Preferred are transparent ones or semitransparent ones, such as those made of NESA film or ITO film. The electrodes may be of a striped pattern for dot matrix display, a pattern for segment display or a combination thereof, depending on the substance of display.

The method of disposing the liquid crystal composition between the flexible substrates with electrodes is not particular limited, and may be a known method. Since flexible substrates are used, the particularly suitable method for a high productivity is to conduct continuously application of the liquid crystal composition to the electrode surface of one flexible substrate with electrode and lamination of the other flexible substrate on the applied liquid crystal composition. The liquid crystal composition in the liquid crystal display device is preferably so oriented that when the liquid crystal display device is set vertically, or substantially vertically, the liquid crystal composition exhibiting a smectic phase has a vertical or substantially vertical smectic layer normal. By this, the visual angle is widened transversely, thereby improving the visibility even when the information display apparatus is set to trains, busses or the like. The method of orientation is not particularly limited. Preferred method is a mechanical orientation method, such as a bending orientation method [Japanese Patent Application Kokai Koho (Laid-open) No. 2-10322] having excellent continuous and high speed productivity, since such method does not require orientation controlling film, such as rubbing film.

The information display apparatus of the present invention may contain a plurality of liquid crystal display devices. For example, when the production apparatus cannot produce liquid crystal display devices of more than 30 cm width, lining up three liquid crystal display devices of 30 cm width in 3 lines provides an information display apparatus having an information-displaying surface of 90 cm in width.

The receiving member receives from the outside external radio signals of the substance to be displayed by the liquid crystal display device, and it preferably comprises an antenna member and a receiving circuit. The receiving member receives a substance transmitted from the outside, and the substance is displayed by the liquid crystal display device.

In order to miniaturize the whole apparatus, the antenna member preferably is at most 10 mm in thickness and comprises a flat or curved dielectric sheet bearing a conductor. Preferred conductor is metal foil or metal tape. The antenna member may be further miniaturized by using loading coils or impedance conversion circuits. When the information display apparatus is set to moving subjects, such as busses or trains, which vary the direction to the transmitting place, it is preferable to use an antenna with a low directivity and a high gain, such as vertical dipole antennas, diversity antennas, ground plane antennas, sleeve antennas, loop antennas, whip antennas and umbrella antennas. When the field intensity is sufficiently high, a part of the antenna member may be connected to the bus body or train body.

As the receiving circuit, any one having a known construction may be suitably used. The system for data transfer is not limited, and in the case of the use on moving subjects, such as busses and trains, preferred is a frequency-modulated (FM) system which is resistive to the influences of external noise.

As to the driving circuit for driving the liquid crystal display device according to the signals from the receiving member, the same driving methods and circuits as those employed for driving low molecular weight ferroelectric liquid crystals may be used. Examples of the method suitable for dot matrix systems include the methods disclosed in Japanese Patent Application Kokai Koho (Laid-open) No. 1-26543 and Japanese Patent Application Kokai Koho (Laid-open) No. 1-97445. In the case of segment systems, known methods may also be used suitably.

In the structure of these circuits, conventional driving driver IC for TN cells or various kinds of common IC may be used. When a solar battery or a thin battery is used as a power supply, it is preferable to use CMOS-IC which consumes very little electricity.

These circuits may be united with the liquid crystal display device in a body.

Examples of the power supply member for supplying electric energy to the driving circuit suitable for making the whole the apparatus thinner and lighter are those comprising solar batteries or film-form thin batteries. When solar batteries are used, combining them with proper secondary batteries decreases the influences of the change of illumination at the place where the information display apparatus is used. Having the power supply member inside the information display apparatus dispenses with the works for setting up external power supply, thereby enlarging the room for selecting the place for setting. The power supply member may be connected to the liquid crystal display device or the receiving member, according to demand.

Examples of suitable solar batteries are those of an inexpensive amorphous silicon-type. For example, when the driving circuit is a CMOS-IC which requires generally a voltage of approximately 3 V, it is desirable to use a solar battery generating a voltage required by the circuit or to supply the required voltage by connecting a plurality of solar batteries in series. The change of the output voltage from solar batteries due to the change of illuminance can be stabilized by equipping with a constant-voltage circuit or by combining with a proper second battery, such as a nickel-cadmium battery.

Suitable examples other than solar batteries are film-form thin batteries, which do not destroy the advantages of light weight and thin thickness. Any commercial film-form thin batteries may be suitably used, for example, DENFIL produced by Kimoto Co., Ltd.

Hereinafter, the present invention will be described referring to Examples, which however do not limit the scope of the present invention.

EXAMPLES 1 TO 42 AND COMPARATIVE EXAMPLE 1

Examples 1 to 12

Liquid crystal compositions comprising one liquid-crystalline copolymer and one low molecular weight liquid-crystalline compound and exhibiting a ferroelectric liquid crystal phase were prepared by using the following liquid-crystalline copolymers (1) to (4) and the following low molecular weight liquid-crystalline compounds A to H as indicated in Table 1. Mixing of the liquid-crystalline copolymers and the low molecular weight liquid-crystalline compounds was conducted by placing predetermined kinds and amounts of those in a vessel, dissolving and mixing them at room temperature in 100 ml of dichloromethane added thereto, and then evaporating out the dichloromethane.

Liquid-Crystalline Copolymer [1]

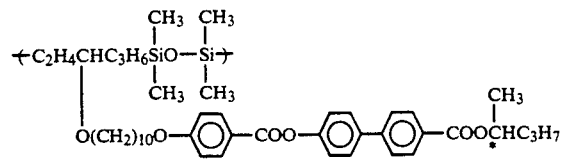

weight average molecular weight: Mw = 4130
tilt angle: $2\theta = 73°$
phase transition temperature (°C.)

(I: isotropic phase, SmC*: chiral smectic C phase, g: glass state)

Synthesis 1: Synthesis of the liquid-crystalline copolymer [1]

[1] Synthesis of

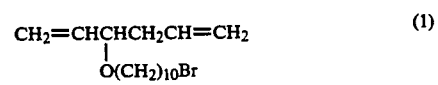

0.1 mol of 1,5-hexadiene-3-ol and 0.17 mol of sodium hydride were stirred in 150 ml of THF for one hour at room temperature. 0.3 mol of 1,10-dibromodecane was added thereto, and reflux was carried out for 12 hours. After the reaction solution was filtered and concentrated, the concentrate was purified by column chromatography, to obtain the objective ether compound (1). (Yield: 63%)

[2] Synthesis of

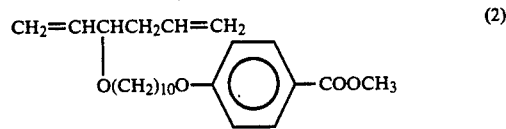

A solution containing 60 mmol of the ether compound (1) obtained in [1], 60 mmol of methyl 4-hydroxybenzoate and 0.2 mol of potassium carbonate dissolved in 150 ml of acetone was refluxed for 12 hours. After the reaction solution was filtered and concentrated, the concentrate was purified by column chromatography, to obtain the objective ether compound (2). (Yield: 77%)

[3] Synthesis of

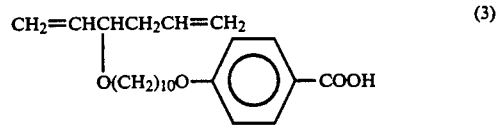

A solution containing 30 mmol of the ether compound (2) obtained in [2], 0.1 mol of sodium hydroxide, 50 ml of ethanol and 20 ml of water was refluxed for 30 minutes. After the reaction solution was poured into 50 ml of water and the mixture was adjusted to pH 2 with a dilute aqueous HCl solution, extraction with ether, drying and concentration were carried out. The concentrate was purified by column chromatography, to obtain the objective carboxylic acid derivative (3). (Yield: 96%)

[4] Synthesis of

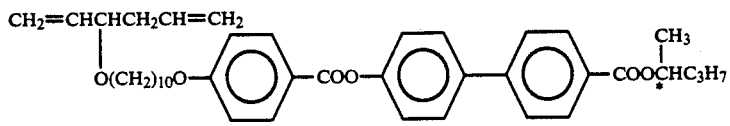

40 g of the carboxylic acid derivative (3) obtained in [3], 34 ml of thionyl chloride and 130 ml of toluene were placed into 1000 ml-four-neck flask equipped with a reflux condenser, and were stirred to form a uniform solution. After 0.2 ml of pyridine was added thereto, the reaction temperature was elevated to 65° C., and heating and stirring were continued for four hours.

Thereafter, the reaction mixture was heated at 65° C. for one hour and further at 80° C. for 30 minutes, under a reduced pressure by using an aspirator, to remove out the toluene and the remaining thionyl chloride. After the reaction mixture was cooled to room temperature, 170 ml of toluene and 11.8 ml of pyridine were added thereto to form a uniform solution. To the solution was added 170 ml of a toluene solution containing 30.5 g of optically active 1-methylbutyl 4'-hydroxybiphenyl-4-carboxylate dropwise over a 30-minutes interval, with stirring. The mixture was stirred overnight at room temperature to complete the reaction.

The reaction mixture was filtered to remove out the precipitated pyridine salt. The filtrate was concentrated by distilling out the solvent under a reduced pressure at a bath temperature of 50° C. by using a rotary evaporator. 80 g of methylene chloride was added to the concentrate, and stirring was carried out to prepare a uniform and transparent solution. The solution was then subjected to a fractuation by a liquid chromatography using a pre-column filled with activated alumina and a main column filled with silica gel. The solvent was distilled out from the eluent containing the objective product under a reduced pressure at a bath temperature of 50° C. by using a rotary evaporator, to obtain a crude product of the objective diene compound (4). The crude product was placed in an 1-liter flask, and 900 ml of ethanol was added thereto. The flask was then equipped with a reflux condenser, and stirring was carried out at 70° C. for 10 minutes. After it was confirmed that white solid was completely dissolved to form a uniform solution, the flask was allowed to cool near room temperature. After the flask was sealed to shut the humidity out, it was placed in a refrigerator and was allowed to stand for more than 4 hours. The flask was then taken out, and the precipitated white solid was collected by suction filtration and washed with ethanol several times. The solid was dried overnight in a vacuum drier at 50° C., to obtain 44.4 g of the objective diene compound (4).

The diene compound exhibited liquid-crystalline properties, and had the following phase transition behavior and properties.

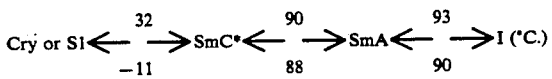

(Cry: crystal phase, SmA: smectic A phase, S1: an unidentified smectic phase)
Response time: 41 μs (68° C.),
Applied electric field: ±20 MV/m
Tilt angle (2θ): 74° (68° C.)

Polyaddition Reaction

After 3.85 g of the diene compound (4) and 0.54 g of tetramethyldisiloxane were dissolved in toluene, 4.0 mg of chloroplatinic acid hexahydrate as a catalyst was added thereto in a stream of gaseous argon, and reaction was carried out at 80° C. for 20 hours.

After the reaction was completed, the reaction mixture was allowed to cool to room temperature, and active carbon was added thereto. After stirring for 10 minutes at 50° C., the active carbon was removed out by filtration. Toluene was distilled out from the reaction mixture under a reduced pressure, and the residue was purified by silica gel column chromatography, to obtain 3.60 g of the objective liquid-crystalline copolymer.

Liquid-crystalline copolymer [2]

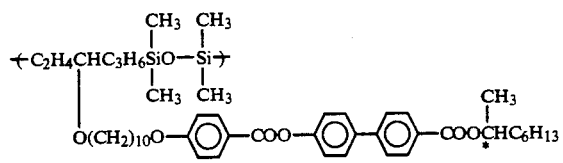

Weight average molecular weight: Mw = 3700
Tilt angle: 2θ = 80°
phase transition temperature (°C.)

$$I \xleftarrow{} \xrightarrow[82]{} SmC^* \xleftarrow{} \xrightarrow[30]{} S1$$

Synthesis 2: Synthesis of the liquid-crystalline copolymer [2]
Synthesis of

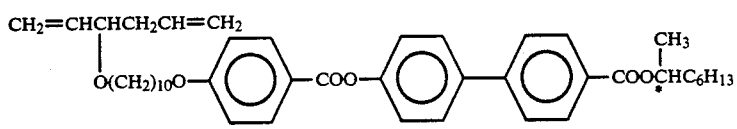

The same procedure of Synthesis 1 was repeated with the exception that 43.2 g of the carboxylic acid derivative (3) obtained in Synthesis 1-[3]and 37.9 g of optically active 1-methylheptyl 4'-hydroxybiphenyl-4-carboxylate were used, to obtain 57.8 g of the above diene compound (5).

The diene compound exhibited liquid-crystalline properties, and exhibited the following phase transition behavior and properties.

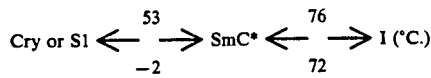

Response time: 25 μs (52° C.),
Tilt angle (2θ): 81° (52° C.)

Polyaddition reaction

The same procedure as in Synthesis 1 was repeated with the exception that the diene compound (5) was used, to obtain the objective liquid-crystalline copolymer.

Liquid-Crystalline Copolymer [3]

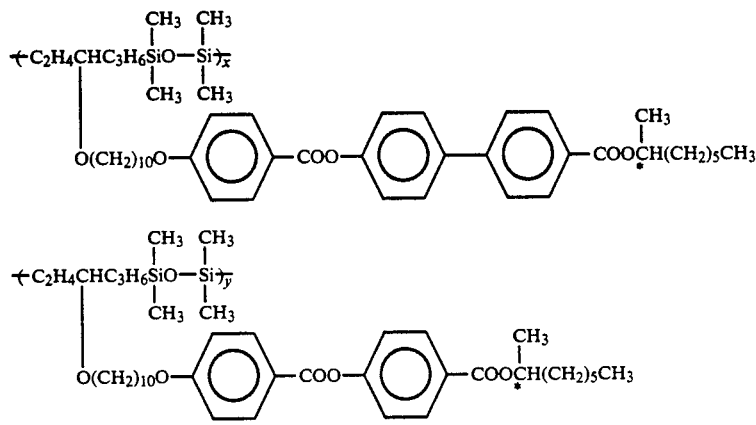

x:y = 86:14
Weight average molecular weight: Mw = 4100
Tilt angle: 2θ = 82°
Phase transition temperature (°C.)

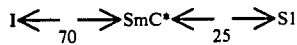

Synthesis 3: Synthesis to the liquid-crystalline copolymer [3]
Synthesis of

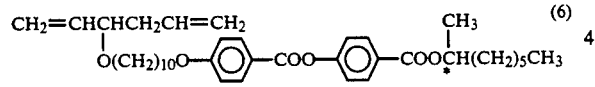

The same procedure employed for the synthesis of the diene compound (4) was repeated with the exception that the same mol number of 1-methylheptyl 4-hydroxybenzoate was used in place of 1-methylheptyl 4′-hydroxybiphenyl-4-carboxylate.

Polyaddition Reaction 14 ml of dried toluene, 1.82 g (2.66 mmol) of the diene compound (4) obtained above, 0.18 g (0.30 mmol) of the diene compound (6) and 0.26 g (1.94 mmol) of 1,1,3,3-tetramethyldisiloxane were stirred in the stream of gaseous argon, to dissolve them into a uniform solution. After 2.0 mg of chloroplatinic acid hexahydrate was added thereto, heating and stirring were carried out at 80° C. for 20 hours. During the stirring, a very little gaseous argon was continuously flowed through to shut out the humidity and oxygen from the reaction vessel.

After completion of the polymerization reaction, the reaction mixture was filtered, and toluene was distilled out from the filtrate. The obtained residue was diluted with 3 g of methylene chloride, and separation and purification were carried out by a column chromatography using silica gel as a filler, to obtain 1.74 g of the objective liquid-crystalline copolymer.

Liquid-Crystalline Copolymer [4]

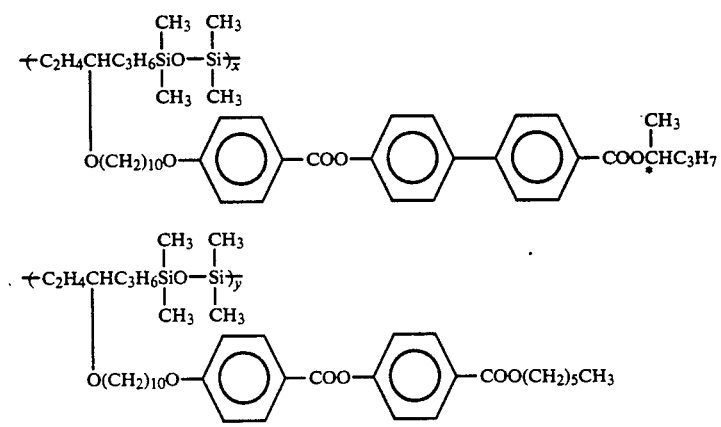

x:y = 80:20

Weight average molecular weight: Mw = 3800
Tilt angle: $2\theta = 76°$
Phase transition temperature (°C.)

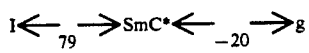

Synthesis 4: Synthesis to the liquid-crystalline copolymer [4]

Synthesis of

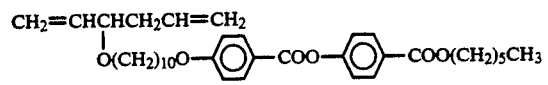

15.0 g (40.0 mmol) of the carboxylic acid derivative (3) obtained in Synthesis 1, 9.52 g (80.0 mmol) of thionyl chloride and 50 ml of dried toluene were placed in a flask, and were stirred to form a uniform solution. 0.02 ml of pyridine was added thereto, and stirring was carried out to form a uniform solution.

The solution was then heated to 65° C., and was heated and stirred for 4 hours. Subsequently, toluene and excessive thionyl chloride were distilled out under a reduced pressure, and 130 ml of toluene and 3.60 g of pyridine were added thereto. A solution containing 7.86 g (35.4 mmol) of 1-n-hexyl 4-hydroxybenzoate dissolved in 130 ml of toluene was added dropwise thereto over a 30-minutes interval. Stirring was then carried out for 18 hours at room temperature.

The reaction mixture was filtered and concentrated, and the concentrate was purified by column chromatography using silica gel and alumina as fillers, to obtain 14.7 g of the objective product.

Polyaddition Reaction 20 ml of dried toluene, 2.45 g (3.82 mmol) of the diene compound (4), 0.55 g (0.95 mmol) of the diene compound (7) and 0.43 g (3.18 mmol) of 1,1,3,3-tetramethyldisiloxane were stirred in the stream of gaseous argon, to dissolve them into a uniform solution. After 2.5 mg of chloroplatinic acid hexahydrate was added thereto, heating and stirring were carried out at 80° C. for 20 hours. During the stirring, a very little gaseous argon was flowed through continuously, to shut out the humidity and oxygen from the reaction vessel.

After completion of the polymerization reaction, the reaction mixture was filtered, and toluene was distilled out from the filtrate. The obtained residue was diluted with 3 g of methylene chloride, and separation and purification were carried out by a column chromatography using silica gel as a filler, to obtain 2.84 g of the objective liquid-crystalline copolymer.

Low Molecular Weight Liquid-Crystalline Compound A

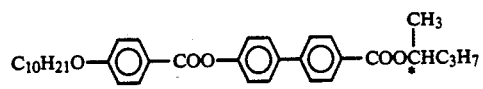

Phase transition temperature (°C.)

Low Molecular Weight Liquid-Crystalline Compound B

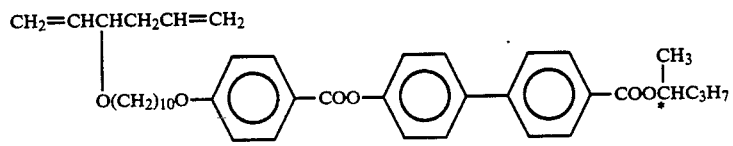

Phase transition temperature (°C.)

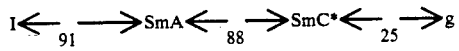

Low Molecular Weight Liquid-Crystalline Compound C

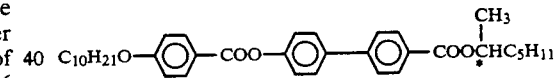

Phase transition temperature (°C.)

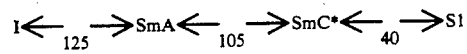

Low Molecular Weight Liquid-Crystalline Compound D

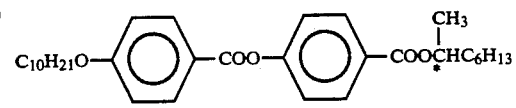

Phase transition temperature (°C.)

Low Molecular Weight Liquid-Crystalline Compound E liquid crystal mixture ZLI-4655-100 (Merk Co., Ltd.)
Phase transition temperature (°C.)

(Ch: chloesteric phase)

Low Molecular Weight Liquid-Crystalline Compound F

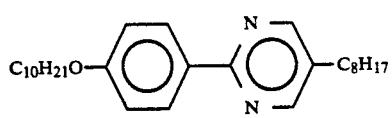

Phase transition temperature (°C.)

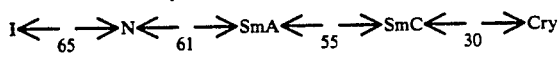

(N: nematic phase, SmC: smectic C phase)

Low Molecular Weight Liquid-Crystalline Compound G

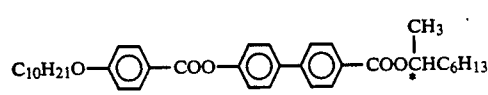

Phase transition temperature (°C.)

Low Molecular Weight Liquid-Crystalline Compound H

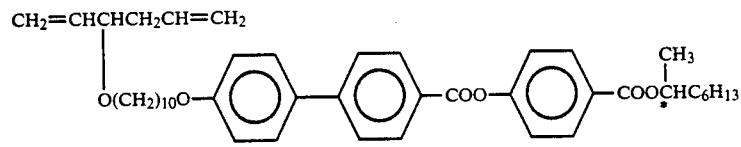

Phase transition temperature (°C.)

($SmC_A^*$: antiferroelectric liquid crystal phase)

The phase transition temperature, the electric field response time $\tau_{10-90}$ and THE tilt angle $2\theta$ of the obtained liquid crystal compositions are shown in Tables 1 and 2. The electric field response time $\tau_{10-90}$ is the time which was taken by the change of the transmittance through a cell of 2 μm thick between crossed polarizers from 10% to 90% with an applied voltage of ±10 V at the room temperature, 25° C. The tilt angle $2\theta$ is the angle determined by measuring the change of an extinction angle between crossed polarizers at the room temperature, 25° C.

Examples 13 to 17

In the same manner as in Example 1, liquid crystal compositions each of which comprised, as indicated in Table 2, one liquid-crystalline copolymer and two low molecular weight liquid-crystalline compounds and exhibited a ferroelectric liquid crystal phase were prepared. The results are shown in Table 2.

Examples 18 to 20

In the same manner as in Example 1, liquid crystal compositions each of which comprised two liquid-crystalline copolymers and one low molecular weight liquid-crystalline compound and exhibited a ferroelectric liquid crystal phase, as indicated in Table 3, were prepared. The results are shown in Table 3.

Example 21

In the same manner as in Example 1, a liquid crystal composition which comprised two liquid-crystalline copolymers and two low molecular weight liquid-crystalline compounds and exhibited a ferroelectric liquid crystal phase, as indicated in Table 3, was prepared. The results are shown in Table 3.

Examples 22 and 23

In the same manner as in Example 1, a liquid crystal composition which comprised one liquid-crystalline copolymer and one low molecular weight liquid-crystalline compound and exhibited an antiferroelectric liquid crystal phase, as indicated in Table 3, was prepared. The results are shown in Table 1.

TABLE 1

| Ex. No. | Liquid-crystalline copolymer 1 | Liquid-crystalline copolymer 2 | Low molecular weight liquid-crystalline compound 1 | Low molecular weight liquid-crystalline compound 2 | Quantities (mg) | Phase transition temperature (°C.) | Electric field response time $\tau_{10-90}$ (ms) | Tilt angle $2\theta$ (°) |
|---|---|---|---|---|---|---|---|---|
| 1 | [1] | | A | | 70:30 | I ←→124 SmA ←→115 SmC* ←→10 g | 11.6 | 66 |
| 2 | [1] | | B | | 80:20 | I ←→107 SmC* ←→0 g | 16.3 | 74 |
| 3 | [1] | | B | | 20:80 | I ←→98 SmA ←→93 SmC* ←→−10 g | 2.1 | 74 |
| 4 | [1] | | C | | 50:50 | I ←→120 SmA ←→103 SmC* ←→15 g | 8.2 | 58 |
| 5 | [1] | | G | | 60:40 | I ←→119 SmA ←→111 SmC* ←→5 g | 10.5 | 66 |

TABLE 1-continued

| Ex. No. | Liquid-crystalline copolymer 1 | 2 | Low molecular weight liquid-crystalline compound 1 | 2 | Quantities (mg) | Phase transition temperature (°C) | Electric field response time $\tau_{10-90}$ (ms) | Tilt angle $2\theta$ (°) |
|---|---|---|---|---|---|---|---|---|
| 6 | [2] | | E | | 80:20 | I $\xrightarrow{90}$ SmC* $\xrightarrow{-20}$ g | 4.0 | 64 |
| 7 | [2] | | F | | 60:40 | I $\xrightarrow{83}$ SmC* $\xrightarrow{-10}$ g | 0.8 | 47 |
| 8 | [3] | | A | | 70:30 | I $\xrightarrow{120}$ SmA $\xrightarrow{113}$ SmC* $\xrightarrow{-20}$ g | 12.7 | 70 |
| 9 | [3] | | E | | 70:30 | I $\xrightarrow{86}$ SmC* $\xrightarrow{-15}$ g | 2.4 | 54 |

TABLE 2

| Ex. No. | Liquid-crystalline copolymer 1 | 2 | Low molecular weight liquid-crystalline compound 1 | 2 | Quantities (mg) | Phase transition temperature (°C) | Electric field response time $\tau_{10-90}$ (ms) | Tilt angle $2\theta$ (°) |
|---|---|---|---|---|---|---|---|---|
| 10 | [3] | | F | | 60:40 | I $\xrightarrow{82}$ SmA $\xrightarrow{70}$ SmC* $\xrightarrow{0}$ g | 0.58 | 38 |
| 11 | [4] | | B | | 60:40 | I $\xrightarrow{94}$ SmC* $\xrightarrow{-10}$ g | 11.8 | 72 |
| 12 | [4] | | E | | 80:20 | I $\xrightarrow{97}$ SmA $\xrightarrow{84}$ SmC* $\xrightarrow{-5}$ g | 7.9 | 49 |
| 13 | [1] | | E | F | 70:20:10 | I $\xrightarrow{102}$ SmA $\xrightarrow{91}$ SmC* $\xrightarrow{-10}$ g | 5.4 | 49 |
| 14 | [1] | | B | C | 56:14:30 | I $\xrightarrow{118}$ SmA $\xrightarrow{108}$ SmC* $\xrightarrow{-3}$ g | 10.2 | 65 |
| 15 | [1] | | C | F | 60:20:20 | I $\xrightarrow{107}$ SmA $\xrightarrow{86}$ SmC* $\xrightarrow{-6}$ g | 3.9 | 43 |
| 16 | [2] | | F | G | 60:28:12 | I $\xrightarrow{90}$ SmA $\xrightarrow{84}$ SmC* $\xrightarrow{10}$ g | 1.3 | 51 |
| 17 | [3] | | E | F | 70:20:10 | I $\xrightarrow{85}$ SmA $\xrightarrow{80}$ SmC* $\xrightarrow{0}$ g | 3.0 | 55 |

TABLE 3

| Ex. No. | Liquid-crystalline copolymer 1 | 2 | Low molecular weight liquid-crystalline compound 1 | 2 | Quantities (mg) | Phase transition temperature (°C) | Electric field response time $\tau_{10-90}$ (ms) | Tilt angle $2\theta$ (°) |
|---|---|---|---|---|---|---|---|---|
| 18 | [1] | [2] | F | | 18:42:40 | I $\xrightarrow{90}$ SmC* $\xrightarrow{-10}$ g | 1.4 | 45 |
| 19 | [4] | [2] | F | | 45:45:10 | I $\xrightarrow{82}$ SmC* $\xrightarrow{-16}$ g | 10.2 | 65 |
| 20 | [1] | [3] | E | | 50:40:10 | I $\xrightarrow{106}$ SmA $\xrightarrow{100}$ SmC* $\xrightarrow{0}$ g | 4 | 56 |
| 21 | [1] | [2] | F | E | 15:45:30:10 | I $\xrightarrow{96}$ SmC* $\xrightarrow{20}$ g | 3 | 45 |
| 22 | [3] | | H | | 40:60 | I $\xrightarrow{55}$ SmC* $\xrightarrow{32}$ SmC$_A$* $\xrightarrow{-10}$ g | 1.7 | 74 |

TABLE 3-continued

| Ex. No. | Liquid-crystalline copolymer 1 | 2 | Low molecular weight liquid-crystalline compound 1 | 2 | Quantities (mg) | Phase transition temperature (°C.) | Electric field response time $\tau_{10-90}$ (ms) | Tilt angle $2\theta$ (°) |
|---|---|---|---|---|---|---|---|---|
| 23 | [1] | | G | | 30:70 | I $\underset{122}{\leftrightarrows}$ SmA $\underset{97}{\leftrightarrows}$ SmC* $\underset{68}{\leftrightarrows}$ SmC$_A$* $\underset{20}{\leftrightarrows}$ g | 1.0 | 57 |

Example 24

The liquid crystal composition prepared in Example 11 was further mixed with 4% by weight of a black pigment NKX-1033 (Trade name, produced by Nippon Kanko Shikiso Co., Ltd.), and the resulting liquid crystal composition exhibited the following phase transition behavior.

Phase transition temperature (°C.)

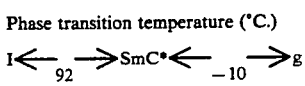

The liquid crystal composition had an electric field response time $\tau_{10-90}$ of 11.0 ms and a tilt angle $2\theta$ of 71°.

Example 25

The liquid crystal composition prepared in Example 14 was further mixed with 5% by weight of a black pigment LCD-465 (Trade name, produced by Nippon Kayaku Co., Ltd.), and the resulting liquid crystal composition exhibited the following phase transition behavior.

Phase transition temperature (°C.)

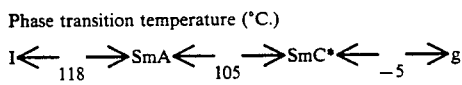

The liquid crystal composition had an electric field response time $\tau_{10-90}$ of 9 ms and a tilt angle $2\theta$ of 64°.

Example 26

The liquid crystal composition prepared in Example 3 was dissolved in toluene to form a 20% by weight solution, and a PES (polyethersulfone) substrate bearing an ITO electrode (produced by Sumitomo Bakelite Co., Ltd.) (width: 150 mm, thickness: 100 μm, length: 20 m) was coated with the solution on the ITO electrode surface by using a micro gravure coater. After the solvent was drying out, the layer of the liquid crystal composition had a thickness of about 2.5 μm. Subsequently, the same kind of substrate not coated with the solution was laminated on the coated substrate so that the uncoated ITO electrode surface became in contact with the layer of the liquid crystal composition by using two rolls (width 200 mm, diameter: 80 mm, one being made of silicon rubber, the other being made of iron), to form an unoriented device.

By using the orienting apparatus as shown in FIG. 1, the unoriented device 1 was oriented by bending it on three rolls 3 (width: 200 mm, diameter: 100 mm, iron rolls), to obtain an oriented device 2. (line speed v=8 m/min, surface temperatures of the rolls: $T_1$=110° C., $T_2$=90° C., $T_3$=85° C.)

After the orienting treatment, the lengthy oriented device was cut off to a length of 20 cm to obtain an oriented liquid crystal display device. When the liquid crystal display device was arranged between crossed polarizers and a direct current voltage of ±10 V was applied between the electrodes at 25° C., a color change between black and yellow was observed with a contrast ratio of about 110. In the light state, namely when the display was yellow, the yellow color was extremely uniform all over the surface of the liquid crystal display device.

Comparative Example 1

Production of an unoriented device and orienting treatment were carried out in the same manner as in Example 26 with the exception that only the low molecular weight liquid-crystalline compound B was used. Orientation conditions: v=8 m/min, $T_1$=100° C., $T_2$=85° C., $T_3$=80° C. The liquid crystal layer was approximately 2 μm thick.

When the oriented device was cut off to a length of 20 cm and was arranged between crossed polarizers and a direct current voltage of ±10 V was applied between two electrodes at 25° C. in the same manner as in Example 26, the display color changed between black and light yellow, with a contrast ratio of 30. The light yellow surface in the light state was covered with strong yellow spots and white spots, which indicated that the thickness of the liquid crystal layer was not sufficiently uniform. By a polarization microscope observation, many zigzag defects were observed, which indicated that orientation of the liquid-crystalline compound was insufficient in spite of the thinner liquid crystal layer than that of the liquid crystal display device obtained in Example 26.

According to the above, it is apparent that even the liquid crystal composition prepared in Example 26 and contained only 20% by weight of the liquid-crystalline copolymer is considerably superior in the film formability and in the ability to be oriented, as compared with low molecular weight liquid-crystalline compounds.

Example 27

When the liquid crystal display device produced in Example 26 was bent gradually at room temperature (25° C.) in a direction perpendicular to the bending direction of the orienting treatment, the orientation of the liquid crystal composition was broken when the radius of curvature was decreased to 4 cm. Accordingly, 5% by weight of PMMA (Trade-name of a polymethylmethacrylate produced by Wako Junyaku Co., Ltd., weight average molecular weight: 120,000) was added to the liquid crystal composition, and a 20% by weight toluene solution of the obtained liquid crystal composition was prepared in the same manner as in Example 26. A liquid crystal display device was produced and oriented in the same manner as in Example 26.

The contrast ratio of the obtained liquid crystal display device was measured to be 95. When the liquid crystal display device was bent gradually in a direction perpendicular to the bending direction of the orienting treatment, the orientation of the liquid crystal composition was maintained until the radius of curvature was decreased to 2 cm.

The above indicates that when the strength of liquid crystal display devices is insufficient due to the small content of liquid-crystalline copolymers in liquid crystal compositions, addition of a small amount of nonliquid-crystalline copolymers improves the strength of the liquid crystal display devices without largely decreasing the contrast.

Example 28

A 25% by weight dichloromethane solution of a liquid crystal composition was prepared by dissolving 9.2 g of the liquid crystal composition prepared in Example 17 and 0.8 g of PMMA (Trade-name of a polymethylmethacrylate produced by Wako Junyaku Co., Ltd., weight average molecular weight: 120,000) as a thermoplastic resin in 30 g of dichloromethane. A PES substrate with a striped ITO electrode (width: 300 mm, thickness: 100 $\mu$m, length: 10 m, rolled sheet) was coated with the solution on the ITO electrode surface by using a micro gravure coater. After the solvent was evaporated out, the coated substrate was laminated with the same kind of substrate with the exception that the direction of the stripe of its ITO electrode is perpendicular to that of the former one, by using a pair of pressing rolls (width: 500 mm, diameter: 80 mm, one being made of a chromium-plated iron, the other being made of rubber), so that the ITO electrode surface of the uncoated substrate came in contact with the liquid crystal layer. The liquid crystal layer was approximately 3 $\mu$m thick.

Immediately after that, a uniaxially orienting is treatment was carried out by using the bending orientation apparatus as shown in FIG. 1 which comprised three rolls. All the three rolls were chromium-plated iron rolls of 80 mm diameter, and were spaced out by 1 mm. The line speed was v=2 m/min, and the surface temperatures of the rolls were adjusted to $T_1=90°$ C., $T_2=80°$ C. and $T_3=80°$ C., so that the device was bent while the first roll heated the liquid crystal composition rapidly to isotropic phase and the second and third rolls cooled the liquid crystal composition to SmA phase. The orienting treatment provided the liquid crystal composition with a homogeneous orientation wherein the smectic layer normal extends in the width direction of the liquid crystal display device, that is, in the direction in which the axes of the rolls used in the orienting treatment extended.

Figure 2:
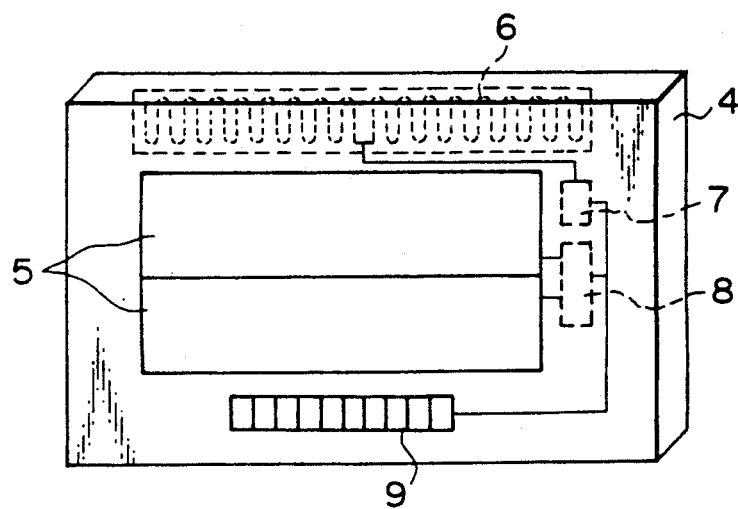
FIG. 2 is a perspective view illustrative of the structure of the information display apparatus produced in Example 28.

After the orienting treatment, and further approximately five minutes after the adhesive was cured, two liquid crystal display devices of 800 mm long were cut out from the lengthy oriented device. The two liquid crystal display devices were disposed between parallel polarizers, and an information display apparatus as shown in FIG. 2 was produced. The information display apparatus comprised the liquid crystal display devices 5, an antenna member 6, a receiving circuit 7, a driving circuit 8 and a solar battery 9 which were housed in a plastic protecting case 4 in one body. The display area provided by the two liquid crystal display devices was 600 mm×800 mm in size. The antenna element 6 was a shortened-type dipole antenna that comprised a sheet of polyimide and a copper foil born on the surface of the polyimide sheet and was 5 mm thick. Signals received by the antenna member 6 are transferred to the receiving circuit 7 and further to the driving circuit 8, and the driving signals made by the driving circuit 8 according to the given signals make the liquid crystal display device 5 display an information. The solar battery 9 used as a power supply was a commercial one comprising amorphous silicon. The applied voltage was 4.5 V.

Trying display with the information display apparatus confirmed that the information display apparatus could sufficiently operate not only outdoors but also indoors with the light from a fluorescent lamp at night. According to a reflecting method, a contrast ratio of 20 or more was ensured. Since a thin ferroelectric polymer liquid crystal display device was used and, further, the direction of orientation (the smectic layer normal) was made vertical, the visibility at a transverse angle was so excellent as to ensure a contrast ratio of 10 or more and a uniform dark blue displaying color up to ±80°.

The information display apparatus was very light and thin with a weight of only 2.1 kg and sizes of 800 mm×1000 mm×20 mm.

When the information display device was laid on its side (a 90°-inclination) to examine the visibility from the side in the same manner as described above, the contrast ratio was decreased below 10 at an angle of ±40° or more, and the displaying color changed gradually from blue to light brown. This indicates apparently that an orientation direction aligning to a vertical line drawn on a liquid crystal display device is desirable for the information display device of the present invention.

Example 29

Figure 3:
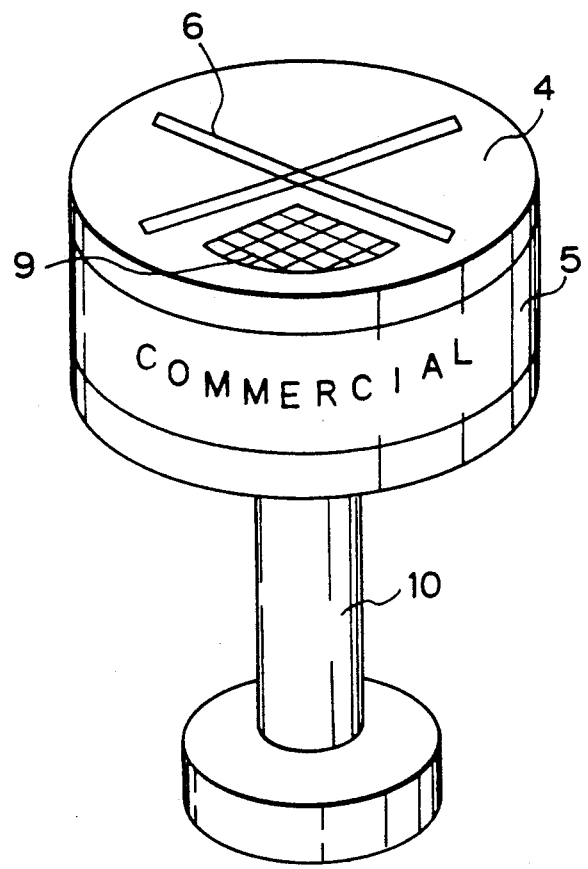
FIG. 3 is a perspective view illustrative of the structure of the information display apparatus produced in Example 29.

An information display apparatus as shown in FIG. 3 was produced by using the ferroelectric polymer liquid crystal composition prepared in Example 1. The method of producing a liquid crystal display device employed in this Example was the same as that employed in Example 26. An orienting treatment was conducted so that when the liquid crystal display device was set vertically in the side wall of the information display apparatus, the liquid crystal composition in the liquid crystal display device had a vertical smectic layer normal.

Thus obtained liquid crystal display device 5 was arranged on the side of a protecting case 4 which was cylindrical in shape, 1500 mm in diameter and 400 mm in height, on the top of which an antenna member 6, which was a diversity antenna, and a solar battery 9 were set up. In the cylindrical protecting case 4 were enclosed a receiving circuit and a driving circuit. The referential numeral 10 represents a leg.

When display was performed with the information display apparatus, a satisfactory display was attained both outdoors and indoors. The flexible substrates enabled display on a curved surface as in this Example, and will also enable a surprising display. Further, since the orientation direction (the smectic layer normal) of the liquid crystal composition was vertical, the visibility at an transverse angle was excellent, and in spite of the curved surface, all the displayed letters were visible and the displayed color was uniform.

Since the whole apparatus consumed very little electricity, the solar battery was exchanged with a DENFIL (Trade-name of a film battery of 54 mm×85 mm×0.5 mm, produced by Kimoto Co., Ltd.) since the whole apparatus consumed very little electricity. Nonetheless, the apparatus functioned more than one year. The information display apparatus excluding the leg was very light and weighed only approximately 1.8 kg.

Liquid-Crystalline Copolymer [5]

$$\text{+C}_2\text{H}_4\text{CHC}_3\text{H}_6\text{SiO}-\overset{\overset{\text{CH}_3}{|}}{\underset{\underset{\text{CH}_3}{|}}{\text{Si}}}\text{O}-\overset{\overset{\text{CH}_3}{|}}{\underset{\underset{\text{CH}_3}{|}}{\text{Si}}}\text{O}-\overset{\overset{\text{CH}_3}{|}}{\underset{\underset{\text{CH}_3}{|}}{\text{Si}}}\text{+}$$

O(CH$_2$)$_{10}$O—⟨O⟩—COO—⟨O⟩—⟨O⟩—COOĊHCH$_3$H$_7$

Weight average molecular weight: Mw = 2800
Tilt angle: 2θ = 74°
Phase transition temperature (°C.)

$$I \xleftarrow[103]{} SmC^* \xleftarrow[-10]{} g$$

Synthesis 5: Synthesis of the liquid-crystalline copolymer [5]

Polyaddition Reaction

The objective liquid-crystalline copolymer was prepared in the same manner and conditions as in Synthesis 1 with the exception that 1.14 g of 1,1,3,3,5,5,7,7-octamethyltetrasiloxane was used as a silane compound.

Liquid-Crystalline Copolymer [6]

+C$_2$H$_4$CHC$_3$H$_6$SiO—SiO—SiO—Si+ (with CH$_3$ groups)

O(CH$_2$)$_{10}$O—⟨O⟩—COO—⟨O⟩—⟨O⟩—COOĊHC$_6$H$_{13}$

Weight average molecular weight: Mw = 2600
Tilt angle: 2θ = 83°
Phase transition temperature (°C.)

$$I \xleftarrow[70]{} SmC^* \xleftarrow[35]{} Sl$$

Synthesis 6: Synthesis of the liquid-crystalline copolymer [6]

Polyaddition Reaction

The objective liquid-crystalline copolymer was prepared in the same manner and conditions as in Synthesis 1 with the exception that 4.07 g of the diene compound (5) obtained in Synthesis 2 and 1.14 g of 1,1,3,3,5,5,7,7-octamethyltetrasiloxane were used as a diene compound and a silane compound, respectively.

Low Molecular Weight Liquid-Crystalline Compound I

Liquid crystal mixture CS-1015 produced by Chisso Co., Ltd.

Phase transition temperature (°C.)

$$I \xleftarrow[78]{} Ch \xleftarrow[68]{} SmA \xleftarrow[57]{} SmC^* \xleftarrow[-17]{} Cry$$

Low Molecular Weight Liquid-Crystalline Compound J

C$_2$H$_5$ĊHCH$_2$CH$_2$CH$_2$O—⟨O⟩—⟨N=N⟩—C$_8$H$_{17}$
(with CH$_3$ branch)

-continued
Phase transition temperature (°C.)

$$I \xleftarrow[51]{} Ch \xleftarrow[47]{} SmC^* \xleftarrow[31]{} Cry$$
$$\downarrow \xrightarrow[17]{} Sx \xrightarrow[10]{} \uparrow$$

Sx: an unidentified smectic phase (because of its instability, measurement was carried out with the temperature changed in a rate of 2° C./min.)

Low Molecular Weight Liquid-Crystalline Compound K

C$_9$H$_{19}$O—⟨O⟩—⟨N=N⟩—C$_9$H$_{19}$

Phase transition temperature (°C.)

$$I \xleftarrow[72]{} SmA \xleftarrow[60]{} SmC \xleftarrow[22]{} Cry$$

Low Molecular Weight Liquid-Crystalline Compound L

C$_9$H$_{19}$O—⟨O⟩—COO—⟨O⟩—OC$_7$H$_{15}$

Phase transition temperature (°C.)

$$I \xleftarrow[85]{} N \xleftarrow[77]{} SmA \xleftarrow[76]{} SmC \xleftarrow[55]{} Cry$$

Examples 30 to 34

In the same manner as in Example 1, liquid crystal compositions each of which comprised one liquid-crystalline copolymer and one low molecular weight liquid-crystalline compound and exhibited a ferroelectric liquid crystal phase, as indicated in Table 4, were prepared. The results are shown in Table 4.

Examples 35 to 38

In the same manner as in Example 1, liquid crystal compositions each of which comprised one liquid-crystalline copolymer and two low molecular weight liquid-crystalline compounds and exhibited a ferroelectric liquid crystal phase, as indicated in Table 4, were prepared. The results are shown in Table 4.

Examples 39 to 41

In the same manner as in Example 1, liquid crystal compositions each of which comprised two liquid-crystalline copolymers and one low molecular weight liquid-crystalline compound and exhibited a ferroelectric liquid crystal phase, as indicated in Table 4, were prepared. The results are shown in Table 4.

Example 42

In the same manner as in Example 1, a liquid crystal composition which comprised two liquid-crystalline copolymers and two low molecular weight liquid-crystalline compounds and exhibited a ferroelectric liquid crystal phase, as indicated in Table 4, was prepared. The results are shown in Table 4.

line copolymer comprising a repeating unit represented by the following formula [I]

TABLE 4-1

| Ex. No. | Liquid-crystalline copolymer 1 | Liquid-crystalline copolymer 2 | Low molecular weight liquid-crystalline compound 1 | Low molecular weight liquid-crystalline compound 2 | Quantities (mg) | Phase transition temperature (°C.) | Electric field response time $\tau_{10-90}$ (ms) | Tilt angle $2\theta$ (°) |
|---|---|---|---|---|---|---|---|---|
| 30 | [1] | | I | | 70:30 | I ⇌109 SmA ⇌92 SmC* ⇌−20 g | 4.6 | 33 |
| 31 | [1] | | F | | 67:33 | I ⇌101 SmA ⇌93 SmC* ⇌−10 g | 2.9 | 47 |
| 32 | [1] | | D | | 67:33 | I ⇌92 SmA ⇌63 SmC* ⇌−12 | 3.2 | 45 |
| 33 | [3] | | K | | 65:35 | I ⇌82 SmC* ⇌15 S1 | 1.0 | 51 |
| 34 | [5] | | F | | 75:25 | I ⇌96 SmA ⇌86 SmC* ⇌−20 g | 2.4 | 47 |
| 35 | [1] | | E | J | 70:20:10 | I ⇌105 SmA ⇌88 SmC* ⇌−20 g | 3.2 | 42 |
| 36 | [1] | | B | F | 42:28:30 | I ⇌81 SmC* ⇌5 g | 3.0 | 47 |

TABLE 4-2

| Ex. No. | Liquid-crystalline copolymer 1 | Liquid-crystalline copolymer 2 | Low molecular weight liquid-crystalline compound 1 | Low molecular weight liquid-crystalline compound 2 | Quantities (mg) | Phase transition temperature (°C.) | Electric field response time $\tau_{10-90}$ (ms) | Tilt angle $2\theta$ (°) |
|---|---|---|---|---|---|---|---|---|
| 37 | [2] | | H | F | 40:21:39 | I ⇌82 SmA ⇌75 SmC* ⇌10 S1 | 0.6 | 45 |
| 38 | [2] | | B | F | 40:20:40 | I ⇌86 SmA ⇌79 SmC* ⇌0 S1 | 1.3 | 45 |
| 39 | [1] | [2] | E | | 40:40:20 | I ⇌100 SmC* ⇌−10 S1 | 2.9 | 55 |
| 40 | [1] | [6] | F | | 20:50:30 | I ⇌85 SmA ⇌74 SmC* ⇌15 S1 | 0.9 | 57 |
| 41 | [1] | [6] | F | | 30:40:30 | I ⇌89 SmA ⇌81 SmC* ⇌0 g | 1.5 | 51 |
| 42 | [1] | [6] | F | L | 20:50:20:10 | I ⇌90 SmA ⇌77 SmC* ⇌−5 g | 2.1 | 49 |

As shown in Tables 1 to 4, combining liquid-crystalline copolymers which were side-chain polymer liquid crystals having alkyl chains and siloxane chains in main chains and low molecular weight liquid-crystalline compounds provided easily liquid crystal compositions which were excellent in the film formability and the ability to be oriented and have a high speed response characteristic to electric field.

Also, using low molecular weight liquid-crystalline compounds having the same mesogen groups as those of the liquid-crystalline copolymers contained in liquid crystal compositions provided a high speed response characteristic to electric field without a large decrease in the tilt angle $2\theta$.

What is claimed is:

1. A liquid crystal composition, comprising: a liquid-crystalline copolymer selected from (a) a liquid-crystal-

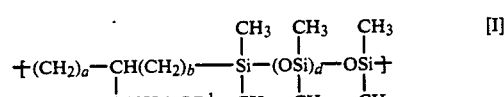

wherein
each of a and b is an integer of 2 to 5, d is an integer of 0 to 3, e is an integer of 1 to 20, and $R^1$ is

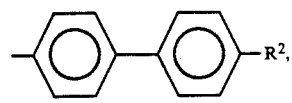

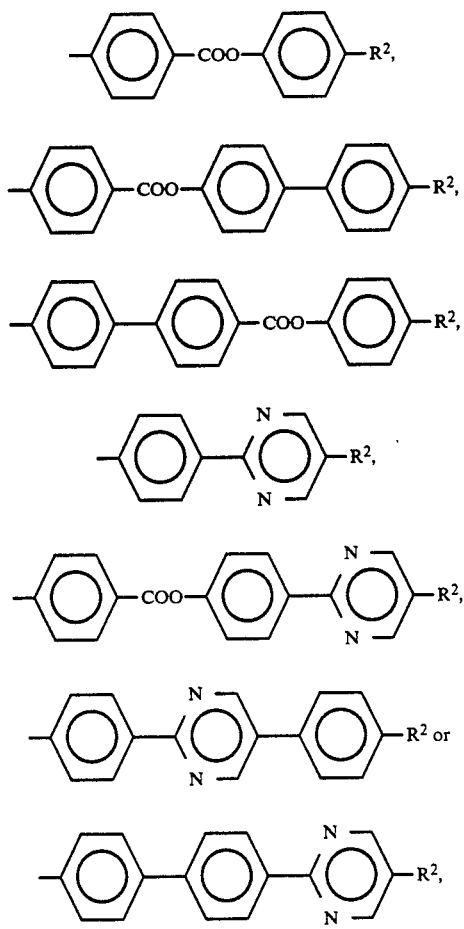

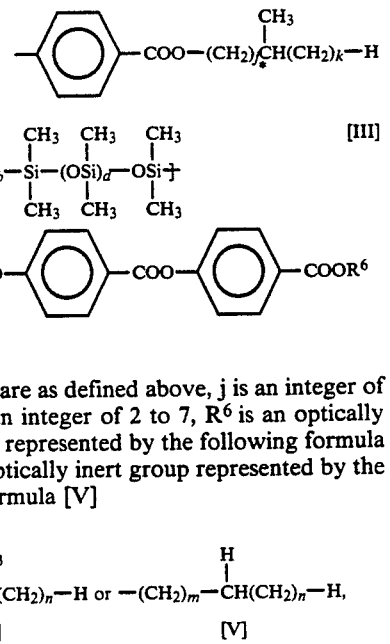

$R^2$ is —COOR$^3$, —OR$^3$ or —OCOR$^3$,
$R^3$ is

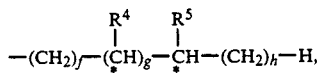

* indicating an asymmetric carbon atom, each of $R^4$ and $R^5$ being methyl group or a halogen atom, f being an integer of 0 to 10, g being an integer of 0 or 1 and h being an integer of 1 to 11 with the proviso that when $R^5$ is methyl group, h is not an integer of 1, and (b) a liquid-crystalline copolymer comprising a repeating unit represented by the following formula [II] and a repeating unit represented by the following formula [III]

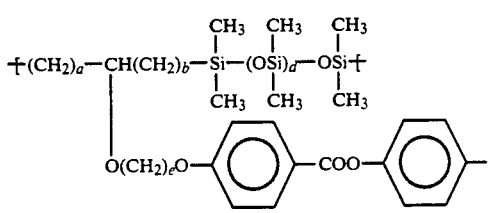

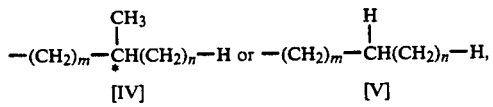

wherein

*, a, b, d and e are as defined above, j is an integer of 0 to 3, k is an integer of 2 to 7, $R^6$ is an optically active group represented by the following formula [IV] or an optically inert group represented by the following formula [V]

$$-(CH_2)_m-\overset{*}{C}H(CH_2)_n-H \text{ or } -(CH_2)_m-\overset{}{C}H(CH_2)_n-H,$$
$$\text{[IV]} \qquad\qquad\qquad \text{[V]}$$

(with CH$_3$ and H substituents respectively)

* being as defined above, m being an integer of 0 to 3, and n being an integer of 2 to 7, the repeating unit [II] and the repeating unit [III] being present in the liquid-crystalline copolymer (b) in a molar ratio [II]/[III] of 1/99 to 99/1;

and a low molecular weight liquid-crystalline compound, the liquid crystal composition containing 5 to 99% by weight of the liquid-crystalline copolymer based on the total of the liquid-crystalline copolymer and the low molecular weight liquid-crystalline compound.

2. The liquid crystal composition of claim 1, wherein the liquid crystal composition exhibits a ferroelectric liquid crystal phase or an antiferroelectric liquid crystal phase.

3. The liquid crystal composition of claim 1, wherein the liquid crystal composition has a dichroism.

4. The liquid crystal composition of claim 1 further comprising a non-liquid-crystalline polymer.

5. The liquid crystal composition of claim 2, wherein the liquid-crystalline copolymer has a weight average molecular weight of 1,000 to 100,000.

6. The liquid crystal composition of claim 5, wherein the repeating unit [II] and the repeating unit [III] are present in the liquid-crystalline copolymer (b) in a molar ratio [II]/[III] of 40/60 to 95/5.

7. The liquid crystal composition of claim 6, wherein the liquid-crystalline copolymer is selected from the group consisting of a liquid-crystalline copolymer comprising a repeating unit represented by the following formula

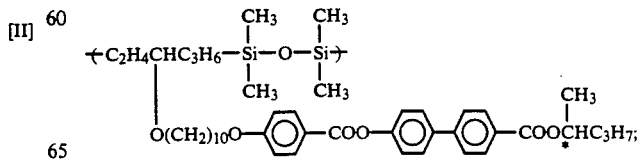

a liquid-crystalline copolymer comprising a repeating unit represented by the following formula

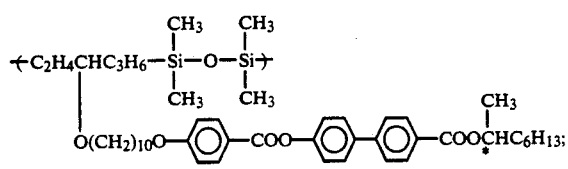

a liquid-crystalline copolymer comprising a repeating unit represented by the following formula

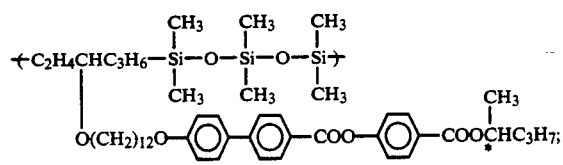

a liquid-crystalline copolymer comprising a repeating unit represented by the following formula

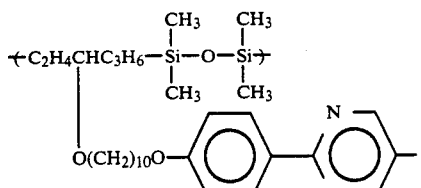

a liquid-crystalline copolymer comprising a repeating unit represented by the following formula

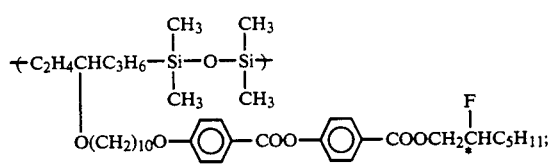

a liquid-crystalline copolymer comprising a repeating unit represented by the following formula

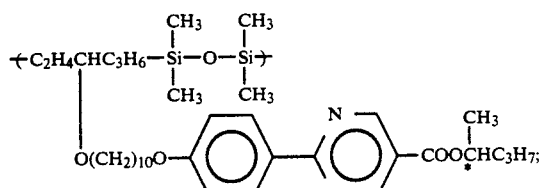

a liquid-crystalline copolymer comprising a repeating unit represented by the following formula

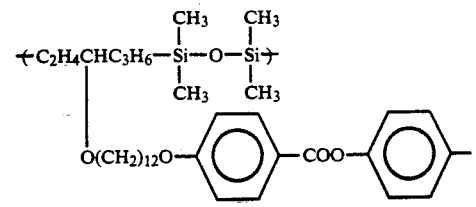

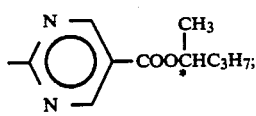

a liquid-crystalline copolymer comprising a repeating unit represented by the following formula

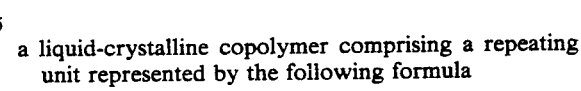

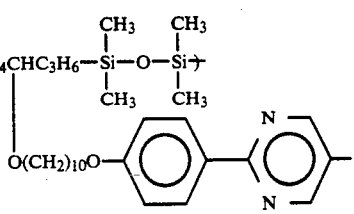

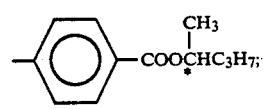

a liquid-crystalline copolymer comprising a repeating unit represented by the following formula

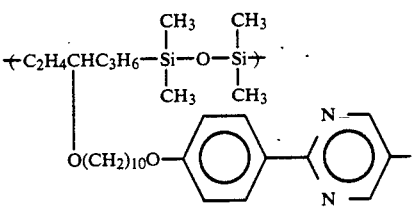

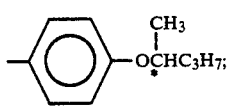

a liquid-crystalline copolymer comprising a repeating unit represented by the following formula

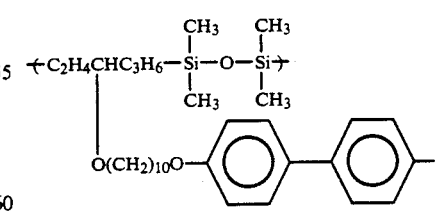

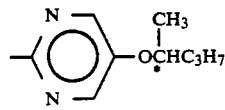

a liquid-crystalline copolymer comprising a repeating unit represented by the following formula

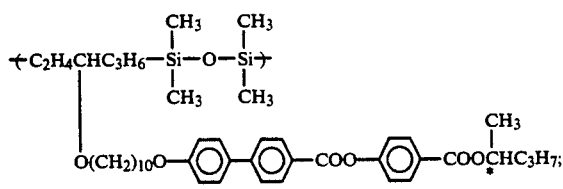

a liquid-crystalline copolymer comprising a repeating unit represented by the following formula

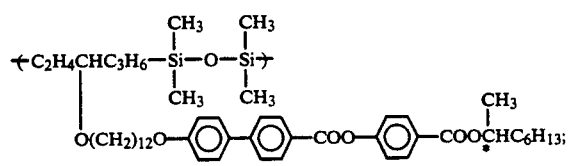

a liquid-crystalline copolymer comprising a repeating unit represented by the following formula

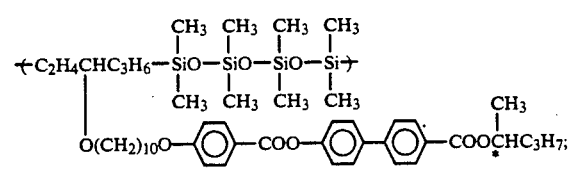

and a liquid-crystalline copolymer comprising a repeating unit represented by the following formula

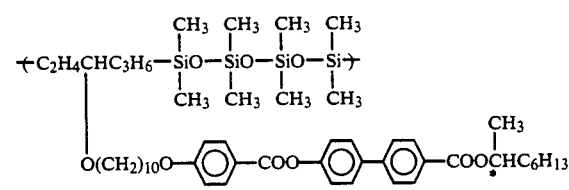

a liquid-crystalline copolymer comprising repeating units represented by the following two formulas

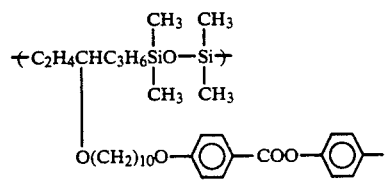

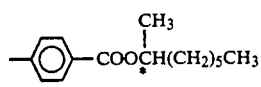

-continued
and

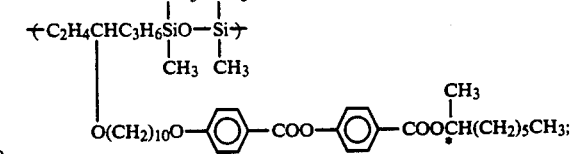

and a liquid-crystalline copolymer comprising repeating units represented by the following two formulas

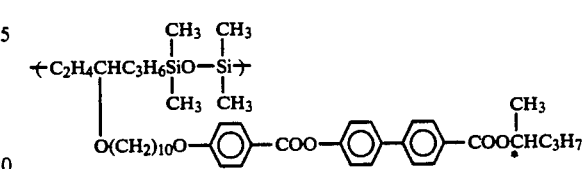

and

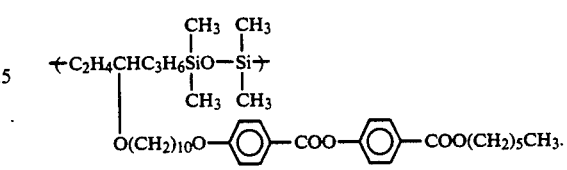

8. The liquid crystal composition of claim 7, wherein the liquid-crystalline copolymer is selected from the group consisting of
a liquid-crystalline copolymer comprising a repeating unit represented by the following formula

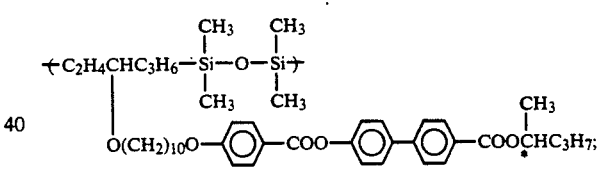

a liquid-crystalline copolymer comprising a repeating unit represented by the following formula

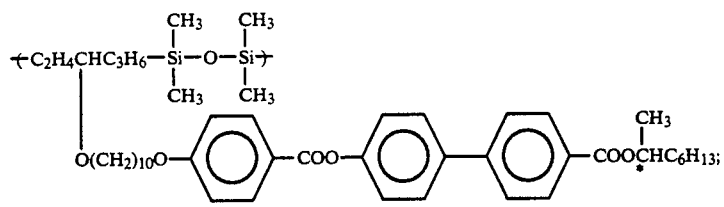

a liquid-crystalline copolymer comprising a repeating unit represented by the following formula

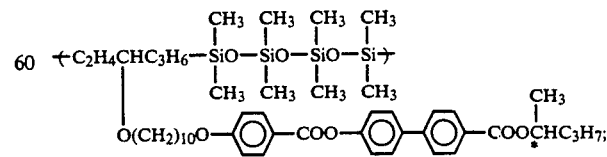

and a liquid-crystalline copolymer comprising a repeating unit represented by the following formula

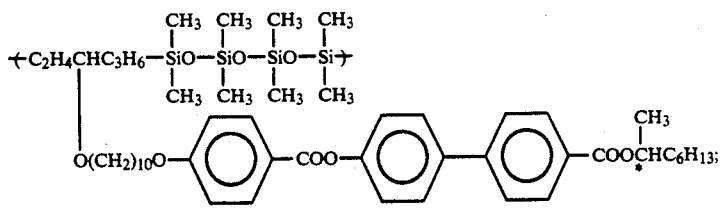
a liquid-crystalline copolymer comprising repeating units represented by the following two formulas
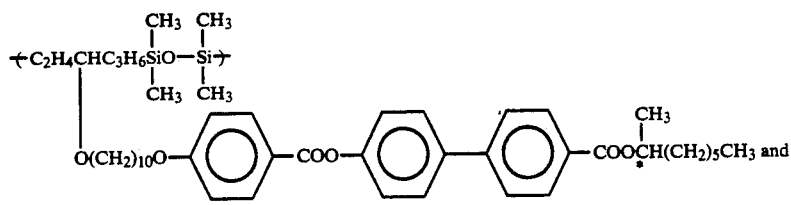
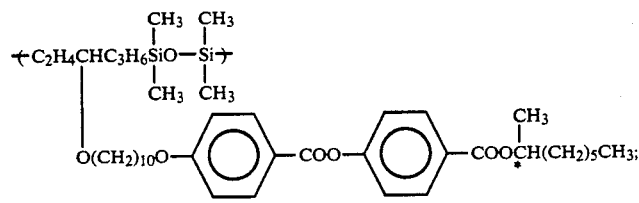
and a liquid-crystalline copolymer comprising repeating units represented by the following two formulas
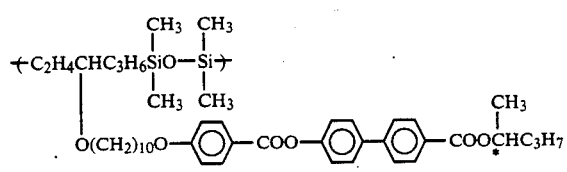
and
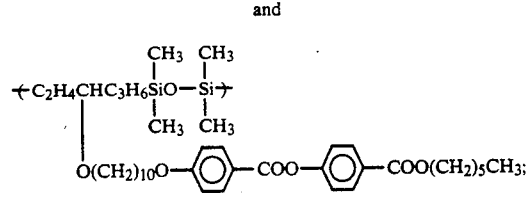
and the low molecular weight liquid-crystalline compound is selected from the group consisting of
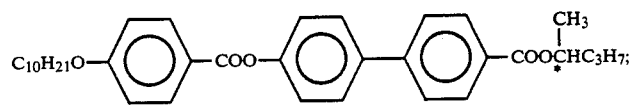
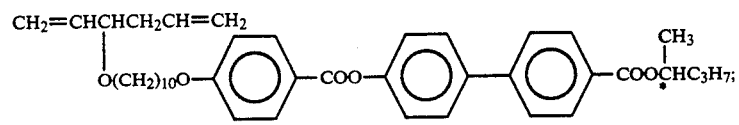
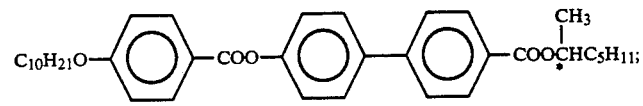
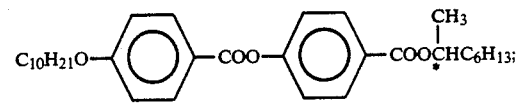
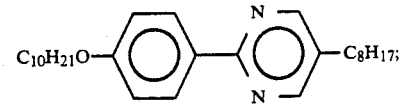

-continued

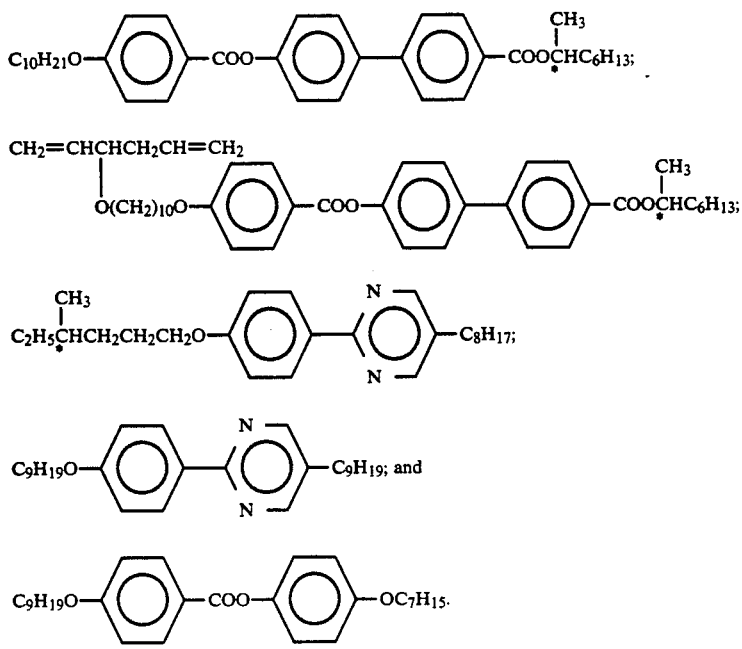

9. The liquid crystal composition of claim 6, wherein the liquid-crystalline copolymer is the liquid-crystalline copolymer (a) comprising the repeating unit [I], and the low molecular weight liquid-crystalline compound has the same mesogen group as the liquid-crystalline copolymer (a) has.

10. The liquid crystal composition of claim 9, wherein the liquid-crystalline copolymer (a) comprises the repeating unit [I] wherein $R^1$ is

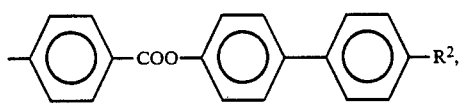

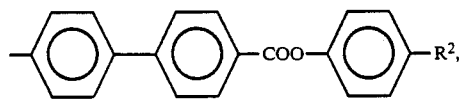

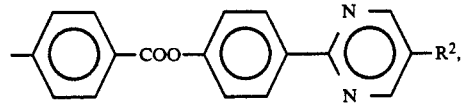

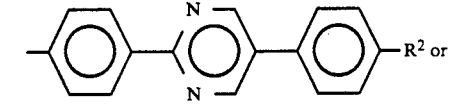

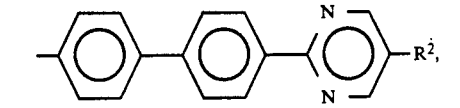

and the low molecular weight liquid-crystalline compound is a tricyclic monomer constituting the repeating unit [I] of the liquid-crystalline copolymer (a) and represented by the following formula $$CH_2=CH(CH_2)_{a-2}-CH(CH_2)_{b-2}CH=CH_2$$
$$\phantom{CH_2=CH(CH_2)_{a-2}-}|$$
$$\phantom{CH_2=CH(CH_2)_{a-2}-}O(CH_2)_cOR^7$$

wherein $R^7$ is

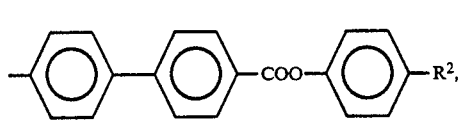

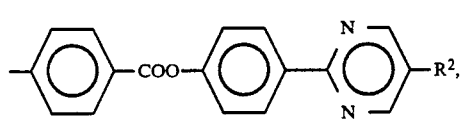

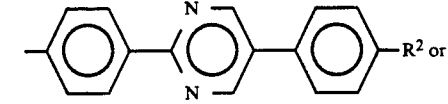

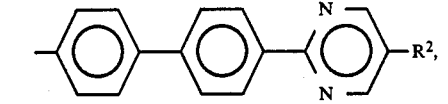

11. The liquid crystal composition of claim 6, wherein the liquid-crystalline copolymer is the liquid-crystalline copolymer (b) comprising the repeating unit [II] and the repeating unit [III], and the low molecular weight liquid-crystalline compound has the same mesogen group as the repeating unit [II] or the repeating unit [III] has.

12. The liquid crystal composition of claim 11, wherein the low molecular weight liquid-crystalline compound is a tricyclic monomer constituting the re-

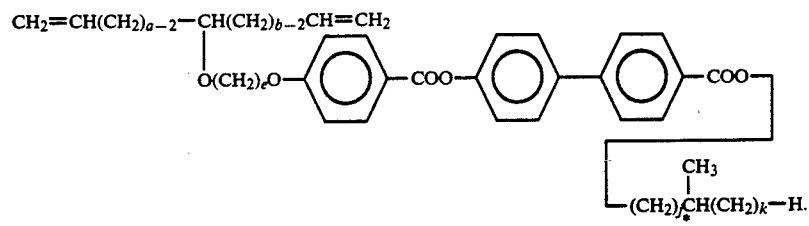
peating unit [II] of the liquid-crystalline copolymer and represented by the following formula
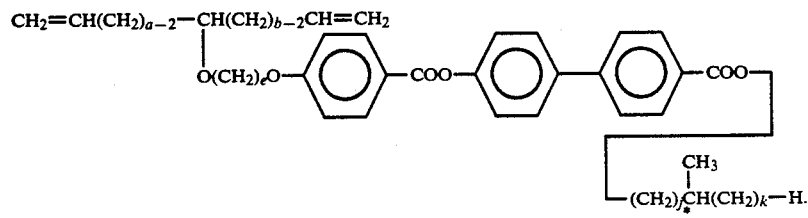
* * * * *